US012666466B2

(12) United States Patent
Dai et al.

(10) Patent No.: US 12,666,466 B2
(45) Date of Patent: Jun. 23, 2026

(54) REDUCED CONTROL CHANNEL MONITORING FOR RANDOM ACCESS PROCEDURES

(71) Applicant: QUALCOMM INCORPORATED, San Diego, CA (US)

(72) Inventors: Jing Dai, Beijing (CN); Jing Lei, San Diego, CA (US); Ruiming Zheng, Beijing (CN); Huilin Xu, Temecula, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/253,189

(22) PCT Filed: Jan. 13, 2021

(86) PCT No.: PCT/CN2021/071406

§ 371 (c)(1),
(2) Date: May 16, 2023

(87) PCT Pub. No.: WO2022/151015

PCT Pub. Date: Jul. 21, 2022

(65) Prior Publication Data

US 2024/0008092 A1     Jan. 4, 2024

(51) Int. Cl.
*H04W 74/0833*     (2024.01)
*H04L 1/1829*      (2023.01)
(Continued)

(52) U.S. Cl.
CPC ....... *H04W 74/0833* (2013.01); *H04L 1/1848* (2013.01); *H04W 74/006* (2013.01); *H04W 74/0836* (2024.01)

(58) Field of Classification Search
None
See application file for complete search history.

(56) References Cited

U.S. PATENT DOCUMENTS

2020/0170045 A1*   5/2020   Lee ..................... H04W 74/006
2020/0314917 A1   10/2020   Jeon et al.
(Continued)

FOREIGN PATENT DOCUMENTS

CN     101646249 A     2/2010
CN     108738134 A     11/2018
(Continued)

OTHER PUBLICATIONS

Supplementary European Search Report—EP21918232—Search Authority—The Hague—Sep. 11, 2024.
(Continued)

*Primary Examiner* — Adnan Baig
(74) *Attorney, Agent, or Firm* — Holland & Hart LLP

(57) ABSTRACT

Methods, systems, and devices for wireless communications are described. Generally, a user equipment (UE) implement a timer (e.g., a round-trip time (RTT) timer) during which it does not monitor a physical downlink control channel (PDCCH). The UE may initiate the timer after transmitting a first random access message or a four-step random access message, or transmitting or retransmitting a third random access message of a four-step random access procedure, or after a physical uplink control channel (PUCCH) resource for hybrid automatic repeat request (HARQ) feedback for a fourth message of a four-step random access procedure. The UE may initiate the timer after transmitting a first message of a two-step random access procedure, or after a PUCCH resource for HARQ feedback for a second message of a two-step random access procedure, or after a fixed offset from the end of a PDSCH of a two-step random access procedure.

30 Claims, 19 Drawing Sheets

(51) Int. Cl.
    *H04W 74/00*       (2009.01)
    *H04W 74/0836*    (2024.01)

(56)             References Cited

U.S. PATENT DOCUMENTS

| | | | |
|---|---|---|---|
| 2020/0314948 A1 | 10/2020 | Babaei et al. | |
| 2021/0014011 A1* | 1/2021 | Xiong | H04L 1/1887 |
| 2022/0132476 A1* | 4/2022 | Yamamoto | H04W 74/002 |
| 2022/0132580 A1* | 4/2022 | Ohara | H04W 74/002 |
| 2023/0354432 A1* | 11/2023 | Behravan | H04W 72/51 |

FOREIGN PATENT DOCUMENTS

| | | | | |
|---|---|---|---|---|
| EP | 3972374 B1 * | 7/2023 | ........ | H04W 74/0833 |
| JP | 2020162170 A | 10/2020 | | |
| WO | WO-2018027656 A1 | 2/2018 | | |
| WO | WO-2020237442 A1 | 12/2020 | | |

OTHER PUBLICATIONS

International Search Report and Written Opinion—PCT/CN2021/071406—ISA/EPO—Oct. 12, 2021.
QUALCOMM: "Summary of Remaining Details on RACH Procedure", 3GPP Draft, 3GPP TSG RAN WG1 Meeting 91, R1-1721476, Nevada, Reno, USA, Nov. 27-Dec. 1, 2017, 32 Pages.

\* cited by examiner 115-b 105-b

SSB, RS, RACH Configuration

305

310

Random Access Message A

Random Access Message B

315

320

HARQ ACK

RRC Connection Setup Information

325

300

1010

1020

1015

1005

1000

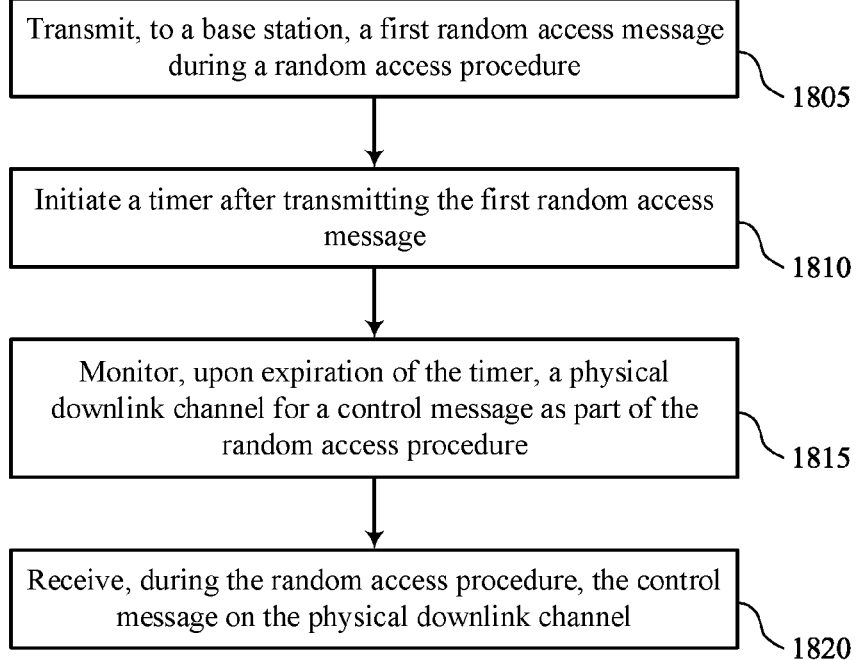

Transmit, to a base station, a first random access message during a random access procedure

1805

Initiate a timer after transmitting the first random access message

1810

Monitor, upon expiration of the timer, a physical downlink channel for a control message as part of the random access procedure

1815

Receive, during the random access procedure, the control message on the physical downlink channel

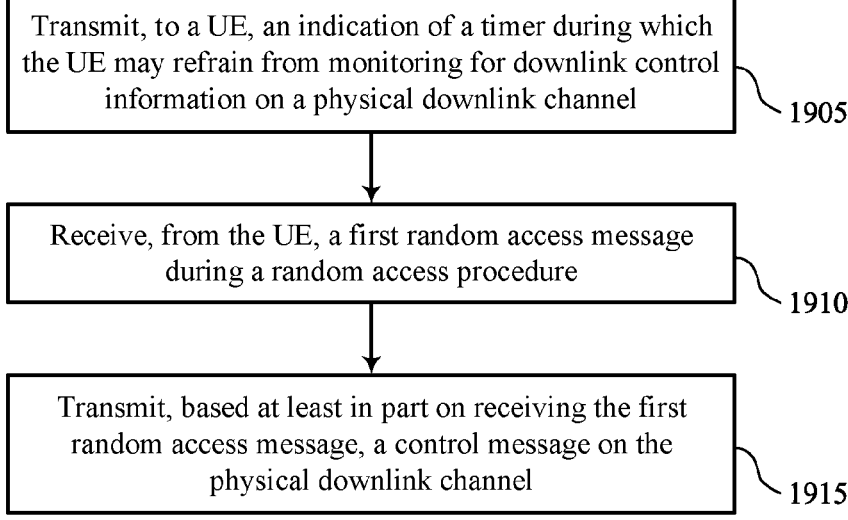

Transmit, to a UE, an indication of a timer during which the UE may refrain from monitoring for downlink control information on a physical downlink channel

1905

Receive, from the UE, a first random access message during a random access procedure

1910

Transmit, based at least in part on receiving the first random access message, a control message on the physical downlink channel

REDUCED CONTROL CHANNEL MONITORING FOR RANDOM ACCESS PROCEDURES

CROSS REFERENCE

The present Application is a 371 national stage filing of International PCT Application No. PCT/CN2021/071406 by Dai et al. entitled "REDUCED CONTROL CHANNEL MONITORING FOR RANDOM ACCESS PROCE-DURES," filed Jan. 13, 2021, which is assigned to the assignee hereof, and which is expressly incorporated by reference in its entirety herein.

FIELD OF TECHNOLOGY

The following relates to wireless communications, including reduced control channel monitoring for random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may perform random access procedures to establish or reestablish a connection with a base station.

SUMMARY

The described techniques relate to improved methods, systems, devices, and apparatuses that support reduced control channel monitoring for random access procedures. Generally, a user equipment (UE) implement a timer (e.g., a round-trip time (RTT) timer) during which it does not monitor a physical downlink control channel (PDCCH). The UE may initiate the timer after transmitting a first random access message or a four-step random access message, or transmitting or retransmitting a third random access message of a four-step random access procedure, or after a physical uplink control channel (PUCCH) resource for hybrid automatic repeat request (HARQ) feedback for a fourth message of a four-step random access procedure. The UE may initiate the timer after transmitting a first message of a two-step random access procedure, or after a PUCCH resource for HARQ feedback for a second message of a two-step random access procedure, or after a fixed offset from the end of a PDSCH of a two-step random access procedure.

A method for wireless communications at a user equipment (UE) is described. The method may include transmitting, to a base station, a first random access message during a random access procedure, initiating a timer after transmitting the first random access message, monitoring, upon expiration of the timer, a physical downlink channel for a control message as part of the random access procedure, and receiving, during the random access procedure, the control message on the physical downlink channel.

An apparatus for wireless communications at a UE is described. The apparatus may include a processor, memory in electronic communication with the processor, and instructions stored in the memory. The instructions may be executable by the processor to cause the apparatus to transmit, to a base station, a first random access message during a random access procedure, initiate a timer after transmitting the first random access message, monitor, upon expiration of the timer, a physical downlink channel for a control message as part of the random access procedure, and receive, during the random access procedure, the control message on the physical downlink channel.

Another apparatus for wireless communications at a UE is described. The apparatus may include means for transmitting, to a base station, a first random access message during a random access procedure, means for initiating a timer after transmitting the first random access message, means for monitoring, upon expiration of the timer, a physical downlink channel for a control message as part of the random access procedure, and means for receiving, during the random access procedure, the control message on the physical downlink channel.

A non-transitory computer-readable medium storing code for wireless communications at a UE is described. The code may include instructions executable by a processor to transmit, to a base station, a first random access message during a random access procedure, initiate a timer after transmitting the first random access message, monitor, upon expiration of the timer, a physical downlink channel for a control message as part of the random access procedure, and receive, during the random access procedure, the control message on the physical downlink channel.

Some examples of the method, apparatuses, and non-transitory computer-readable medium described herein may further include operations, features, means, or instructions for refraining from monitoring for the control message for a duration of the timer.

Some examples of the method, apparatuses, and non-transitory computer-readable medium described herein may further include operations, features, means, or instructions for transmitting the first random access message includes transmitting a first message of a four-step random access procedure and monitoring for the control message includes monitoring for a second random access message of the four-step random access procedure.

Some examples of the method, apparatuses, and non-transitory computer-readable medium described herein may further include operations, features, means, or instructions for initiating, at a first transmission time interval boundary of a next control resource set after expiration of the timer, a random access response monitoring window, where the monitoring occurs during the random access response monitoring window.

Some examples of the method, apparatuses, and non-transitory computer-readable medium described herein may further include operations, features, means, or instructions for transmitting the first random access message includes transmitting a third message of a four-step random access procedure and monitoring for the control message includes monitoring for a scheduling downlink control information message instructing the UE to send a retransmission of the third message of the four-step random access procedure.

Some examples of the method, apparatuses, and non-transitory computer-readable medium described herein may further include operations, features, means, or instructions for initiating, upon expiration of the timer, a contention resolution window, where the monitoring occurs during the contention resolution window.

Some examples of the method, apparatuses, and non-transitory computer-readable medium described herein may further include operations, features, means, or instructions for receiving the scheduling downlink control information message instructing the UE to send the retransmission of the third message of the four-step random access procedure, transmitting, during the contention resolution window, the retransmission of the third message of the four-step random access procedure, restarting the timer after transmitting the retransmission of the third message of the four-step random access procedure and upon expiration of the contention resolution window, initiating, upon expiration of the restarted timer, a second contention resolution window, and monitoring, during the second contention resolution window, the physical downlink channel for a second control message as part of the random access procedure.

Some examples of the method, apparatuses, and non-transitory computer-readable medium described herein may further include operations, features, means, or instructions for transmitting the first random access message includes transmitting a third message of a four-step random access procedure and monitoring for the control message includes monitoring for a retransmission of a fourth message of the four-step random access procedure.

Some examples of the method, apparatuses, and non-transitory computer-readable medium described herein may further include operations, features, means, or instructions for initiating a contention resolution window after transmitting the third message of the four-step random access procedure, monitoring, during the contention resolution window, for the fourth message of the four-step random access procedure, determining, based on the monitoring, that the UE may have failed to receive the fourth message of the four-step random access procedure, identifying an uplink control resource allocated for transmitting feedback information to the base station, and refraining from transmitting a feedback message indicating that the UE may have successfully received the third message of the four-step random access procedure on the uplink control resource, where monitoring for the retransmission of the fourth message of the four-step random access procedure may be based on refraining from transmitting the feedback message.

Some examples of the method, apparatuses, and non-transitory computer-readable medium described herein may further include operations, features, means, or instructions for initiating the timer during the contention resolution window after a last transmission time interval boundary of the uplink control resource.

Some examples of the method, apparatuses, and non-transitory computer-readable medium described herein may further include operations, features, means, or instructions for transmitting the first random access message includes transmitting a first message of a two-step random access procedure and monitoring for the control message includes monitoring for a second random access message of the two-step random access procedure.

Some examples of the method, apparatuses, and non-transitory computer-readable medium described herein may further include operations, features, means, or instructions for initiating, at a first transmission time interval boundary of a next control resource set after expiration of the timer, a random access response monitoring window, where the monitoring occurs during the random access response monitoring window.

Some examples of the method, apparatuses, and non-transitory computer-readable medium described herein may further include operations, features, means, or instructions for transmitting the first random access message includes transmitting a first message of a two-step random access procedure and monitoring for the control message includes monitoring for a retransmission of a second message of the two-step random access procedure.

Some examples of the method, apparatuses, and non-transitory computer-readable medium described herein may further include operations, features, means, or instructions for initiating, at a first transmission time interval boundary of a next control resource set after expiration of the timer, a random access response monitoring window, monitoring, during the random access response monitoring window, for the second message of the two-step random access procedure, determining, based on the monitoring, that the UE may have failed to receive the second message of the two-step random access procedure, and transmitting, on an uplink control resource allocated for transmitting feedback information to the base station, a feedback message indicating that the UE may have not received the second message of the two-step random access procedure.

Some examples of the method, apparatuses, and non-transitory computer-readable medium described herein may further include operations, features, means, or instructions for initiating the timer during the random access response monitoring window after a last transmission time interval boundary of the uplink control resource.

In some examples of the method, apparatuses, and non-transitory computer-readable medium described herein, initiating the timer may include operations, features, means, or instructions for identifying a fixed offset value, applying the fixed offset value after a last transmission time interval boundary of resources allocated for receiving the second message of the two-step random access procedure, and initiating the timer during the random access response monitoring window after the fixed offset value.

Some examples of the method, apparatuses, and non-transitory computer-readable medium described herein may further include operations, features, means, or instructions for receiving, from the base station, system information including an indication of a duration of the timer.

Some examples of the method, apparatuses, and non-transitory computer-readable medium described herein may further include operations, features, means, or instructions for receiving, in a previous random access message, an indication of a duration of the timer.

Some examples of the method, apparatuses, and non-transitory computer-readable medium described herein may further include operations, features, means, or instructions for receiving, from the base station, discontinuous reception configuration information, the discontinuous reception configuration information including an indication of a duration of the timer.

Some examples of the method, apparatuses, and non-transitory computer-readable medium described herein may further include operations, features, means, or instructions for receiving, from the base station, an instruction to apply the timer to the random access procedure, where initiating the timer may be based on receiving the instruction.

Some examples of the method, apparatuses, and non-transitory computer-readable medium described herein may further include operations, features, means, or instructions for identifying one or more physical random access channel resources for transmitting the first random access message or a second random access message, where the identified one or more physical random access channel resources may be associated with the timer, where initiating the timer may be based on the identified one or more physical random access channel resources.

Some examples of the method, apparatuses, and non-transitory computer-readable medium described herein may further include operations, features, means, or instructions for including, in the first random access message, an indication of a duration of the timer, where initiating the timer may be based on including the indication of the duration of the timer in the first random access message.

Some examples of the method, apparatuses, and non-transitory computer-readable medium described herein may further include operations, features, means, or instructions for transmitting, to the base station, an indication that the UE may be a reduced capacity UE, where initiating the timer may be based on transmitting the indication.

In some examples of the method, apparatuses, and non-transitory computer-readable medium described herein, the UE may be a reduced-capability UE.

A method for wireless communications at a base station is described. The method may include transmitting, to a UE, an indication of a timer during which the UE may refrain from monitoring for downlink control information on a physical downlink channel, receiving, from the UE, a first random access message during a random access procedure, and transmitting, based on receiving the first random access message, a control message on the physical downlink channel.

An apparatus for wireless communications at a base station is described. The apparatus may include a processor, memory in electronic communication with the processor, and instructions stored in the memory. The instructions may be executable by the processor to cause the apparatus to transmit, to a UE, an indication of a timer during which the UE may refrain from monitoring for downlink control information on a physical downlink channel, receive, from the UE, a first random access message during a random access procedure, and transmit, based on receiving the first random access message, a control message on the physical downlink channel.

Another apparatus for wireless communications at a base station is described. The apparatus may include means for transmitting, to a UE, an indication of a timer during which the UE may refrain from monitoring for downlink control information on a physical downlink channel, means for receiving, from the UE, a first random access message during a random access procedure, and means for transmitting, based on receiving the first random access message, a control message on the physical downlink channel.

A non-transitory computer-readable medium storing code for wireless communications at a base station is described. The code may include instructions executable by a processor to transmit, to a UE, an indication of a timer during which the UE may refrain from monitoring for downlink control information on a physical downlink channel, receive, from the UE, a first random access message during a random access procedure, and transmit, based on receiving the first random access message, a control message on the physical downlink channel.

In some examples of the method, apparatuses, and non-transitory computer-readable medium described herein, transmitting the indication of the timer may include operations, features, means, or instructions for transmitting system information including the indication of the timer.

In some examples of the method, apparatuses, and non-transitory computer-readable medium described herein, transmitting the indication of the timer may include operations, features, means, or instructions for transmitting a second random access message prior to the first random access message, the second random access message including the indication of the timer.

In some examples of the method, apparatuses, and non-transitory computer-readable medium described herein, transmitting the indication of the timer may include operations, features, means, or instructions for transmitting discontinuous reception configuration information, the discontinuous reception configuration information including the indication of the timer.

Some examples of the method, apparatuses, and non-transitory computer-readable medium described herein may further include operations, features, means, or instructions for transmitting, to the UE, an instruction to apply the timer to the random access procedure, where initiating the timer may be based on receiving the instruction.

In some examples of the method, apparatuses, and non-transitory computer-readable medium described herein, the UE may be a reduced-capability UE.

BRIEF DESCRIPTION OF THE DRAWINGS

FIGS. 18 and 19 show flowcharts illustrating methods that support reduced control channel monitoring for random access procedures in accordance with aspects of the present disclosure.

DETAILED DESCRIPTION

Figure 1:
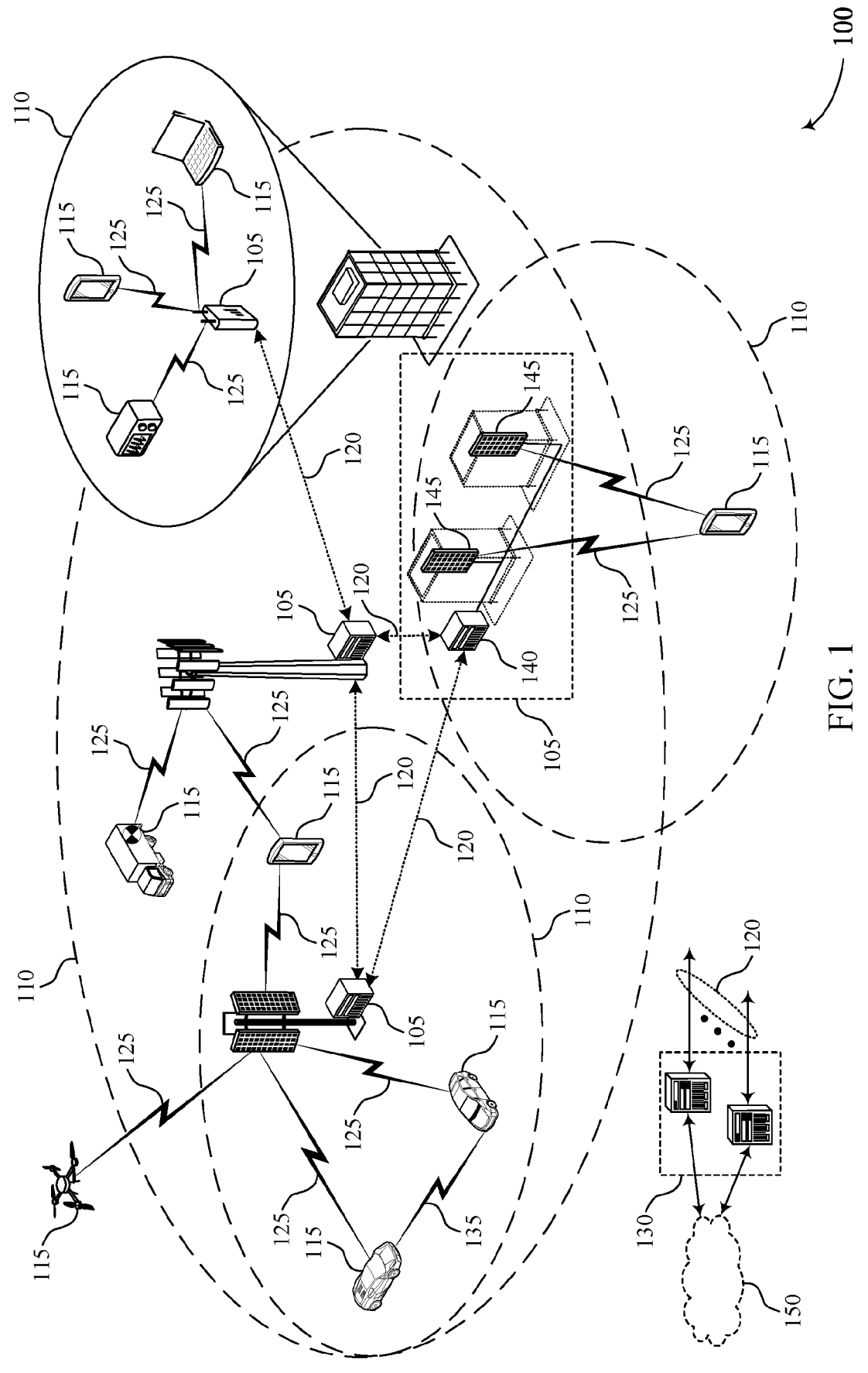
FIG. 1 illustrates an example of a wireless communications system that supports reduced control channel monitoring for random access procedures in accordance with aspects of the present disclosure.

Some examples of a wireless communications system may support various user equipments (UE) of different capabilities. For example, some UEs (e.g., reduced capability (RedCap) UEs), may be designed for reduced power expenditures, increased efficiency, or the like. RedCap UEs (e.g., wearable devices such as smart watches, meters, industrial wireless sensor networks (IWSNs), surveillance cameras, or the like) may support scalable, cost effective, and more flexible deployments of the wireless communications system (e.g., a 5G system).

In some examples, a UE may perform one or more random access procedures to establish or re-establish a connection with a base station. Each random access procedure may include transmitting one or more uplink random access messages, and monitoring for and receiving one or more downlink messages. During each monitoring period, the UE may expend power during physical downlink control channel (PDCCH) monitoring for downlink control messages as part of the random access procedure. In some examples, RedCap UEs may perform more random access procedures than other UEs (e.g., due to sparse UL transmissions of industrial wireless sensors (IWSs) or surveillance cameras, resulting in increased likelihood of out-of-synch uplink transmissions, coverage limitations due to RedCap deployment, increased mobility, or the like). Thus, RedCap UEs (or other UEs) may perform PDCCH monitoring during an increased number of random access procedures, resulting in increased power expenditures (e.g., due to PDCCH monitoring).

In some examples, a UE may refrain from performing PDCCH monitoring for some amount of time to conserve power during some portions of a random access procedure. For instance, a delay may occur during which a base station may process related uplink control information or data transmissions from the UE, process and prepare downlink control or data transmissions, or both. During this delay, there may be no PDCCH transmissions for the UE to receive. Thus, it may be inefficient for the UE to monitor a PDCCH for control messages during such delays. Instead, to conserve power without risking missed PDCCH transmissions, the UE may implement a timer (e.g., a round-trip time (RTT) timer) during which it does not monitor the PDCCH. Implementing such a timer may result in power savings and increased system efficiencies. In some examples, techniques described herein may result in even greater power savings in wireless communications systems with longer RTTs (e.g., a non-terrestrial network (NTN) where the RTT between the network and the UE is longer than the RTT in other systems). The UE may initiate the timer after transmitting a first message (e.g., Msg 1) or a third message (e.g., Msg 3) of a four-step random access procedure, after transmitting a retransmission of the third message of a four-step random access procedure, or after a PUCCH resources for hybrid automatic repeat request (HARQ) feedback for a fourth message (e.g., Msg 4) of a four-step random access procedure (e.g., in the case of unsuccessful Msg 4 reception). Similarly, the UE may initiate the timer after transmitting a first message (e.g., Msg A) of a two-step random access procedure, or after PUCCH resources for HARQ feedback for a second message (e.g., Msg B) of a two-step random access procedure, or after a fixed offset from the end of a Msg B physical downlink shared channel (PDSCH) of a two-step random access procedure.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to reduced control channel monitoring for random access procedures.

FIG. 1 illustrates an example of a wireless communications system 100 that supports reduced control channel monitoring for random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs

115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be an example of a smartphone (e.g., an eMBB), a vehicle to everything (e.g., V2X) device, an ultra reliable low latency communication (URLLC) equipped UE, a wearable device, or the like. In some examples of the wireless communications system 100 (e.g., in a 5G system), one or more UEs 115 may be reduced capability (RedCap) UEs. RedCap UEs may support decreases in peak throughput, latency, reliability, or other requirements, and may experience increased efficiency (e.g., decreased power consumption and system overhead), as well as cost improvements (e.g., smaller supported bandwidths, fewer antennas or smaller antennas, or the like).

In some examples, it may be inefficient for a UE 115 to perform PDCCH monitoring during delays when there is no PDCCH to receive. In such examples, to conserve power without risking missed PDCCH transmissions, the UE 115 may implement a timer (e.g., a round-trip time (RTT) timer) during which it does not monitor the PDCCH. The UE may initiate the timer after transmitting a first message (e.g., Msg 1) or a third message (e.g., Msg 3) of a four-step random access procedure, after transmitting a retransmission of the third message of a four-step random access procedure, or after a PUCCH resources for hybrid automatic repeat request (HARQ) feedback for a fourth message (e.g., Msg 4) of a four-step random access procedure (e.g., in the case of unsuccessful Msg 4 reception). Similarly, the UE may initiate the timer after transmitting a first message (e.g., Msg A) of a two-step random access procedure, or after PUCCH resources for HARQ feedback for a second message (e.g., Msg B) of a two-step random access procedure, or after a fixed offset from the end of a Msg B PDSCH of a two-step random access procedure.

Figure 2:
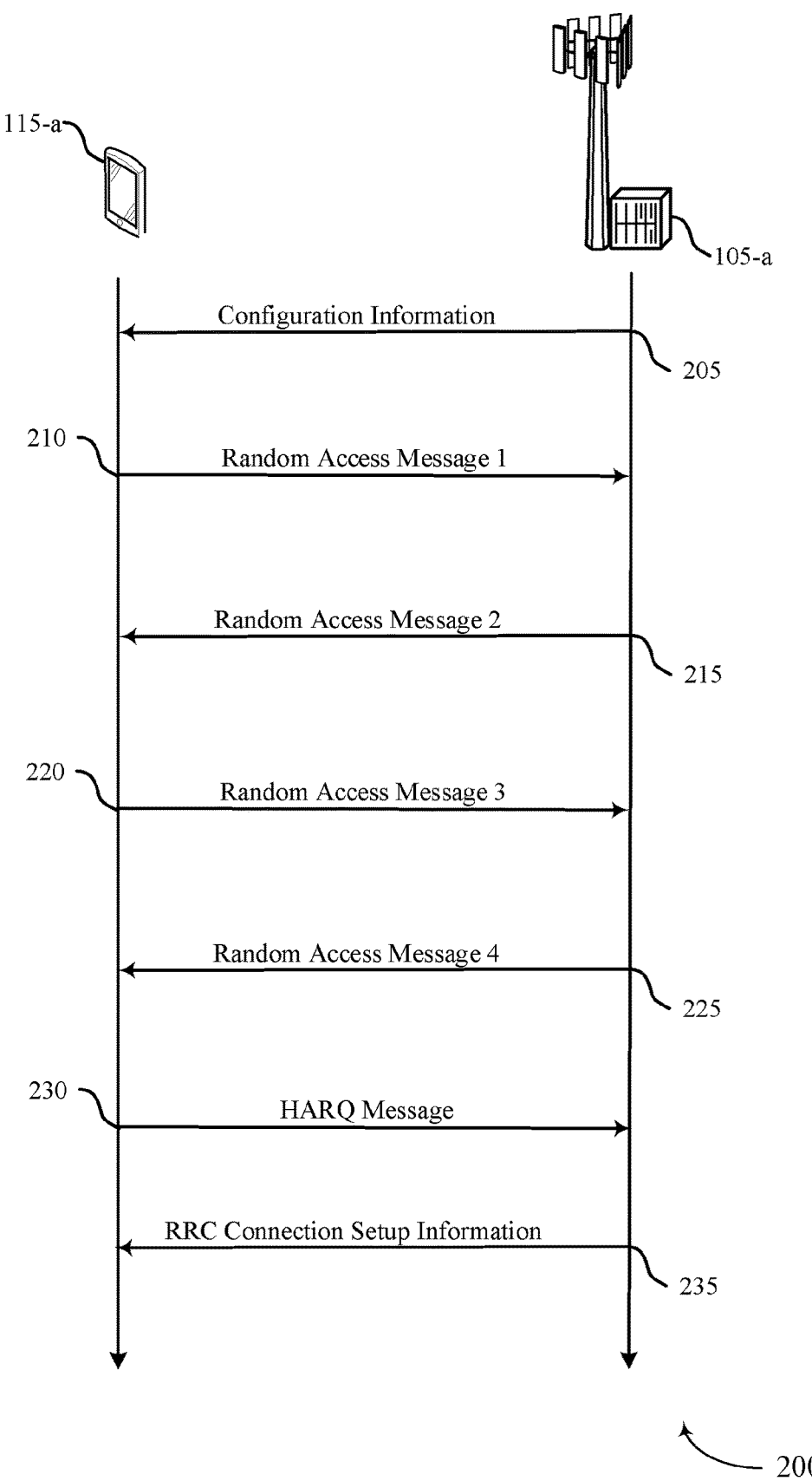
FIG. 2 illustrates an example of a process flow that supports reduced control channel monitoring for random access procedures in accordance with aspects of the present disclosure.

FIG. 2 illustrates an example of a process flow 200 that supports reduced control channel monitoring for random access procedures in accordance with aspects of the present disclosure. In some examples, process flow 200 may implement aspects of wireless communications system 100. Process flow 200 may include a UE 115-a, and a base station 105-a, which may be examples of corresponding devices described with reference to FIG. 1.

UE 115-a may establish a communication link with base station 105-a by using a four-step random access procedure. In such cases, UE 115-a may transmit at least two random access messages (e.g., random access message 1 and random access message 3) and base station 105-a may transmit at least two random access messages (e.g., random access message 2 and random access message 4).

At 205, base station 105-a may transmit configuration information to UE 115-a. The configuration information may include SSB configuration (e.g., including resource allocation for SSBs, timing information, an indication of beams associated with respective SSBs, or the like), reference signal configuration information, physical random access channel (PRACH) resource configuration, or the like. In some examples, base station 105-a may transmit the configuration information in system information, radio resource control (RRC) signaling, or the like. In some examples, configuration information 205 or another configuration message may include channel quality threshold information, channel quality threshold measurement difference threshold information, or the like.

In some examples, UE 115-a may select a beam for transmitting message 1 (e.g., at 210) based on receiving one or more SSBs. For instance, UE 115-a may perform a beam search procedure, or a beam measurement procedure. UE 115-*a* may monitor for and receive multiple SSBs transmitted by base station 105-*a* on different beams. UE 115-*a* may perform one or more measurements on the received SSBs (e.g., RSRP measurements, RSRQ measurements, or the like). UE 115-*a* may select a preferred beam of the various beams, and may select a PRACH resource corresponding to the preferred beam on which to transmit random access message A. Thus, UE 115-*a* may program an uplink beam in radio frequency for one or more symbols based on the measurement procedure. Base station 105-*a* may be able to determine which of the beams is the preferred beam based on the PRACH resources over which base station 105-*a* receives random access message 1.

At 210, UE 115-*a* may initiate a random access procedure by transmitting random access message 1 (e.g., Msg 1). UE 115-*a* may transmit random access message 1 on a PRACH resource associated with the preferred beam (e.g., the beam having the best measurement value). UE 115-*a* may program a transmit beam in radio frequency for one or more symbols for performing the random access procedure. In some cases, random access message 1 may include a random access channel (RACH) preamble. In one example, the RACH preamble may carry a random access radio network temporary identifier (RA-RNTI). As shown, UE 115-*a* may transmit random access message 1 to base station 105-*a*.

Upon receiving random access message 1, base station 105-*a* may decode random access message 1 (e.g., a RACH preamble) and may obtain the RA-RNTI. In some cases, the RA-RNTI may be calculated from a resource used to transmit the RACH preamble. For instance, base station 105-*a* may utilize the time and frequency allocation of the preamble resource to calculate the RA-RNTI. UE 115-*a* may monitor for PDCCH during a response window (e.g., a random access response (RAR) window). The response window may be configured by the base station (e.g., via system information) and may have a value of a number of slots (e.g., 1 to 160 slots).

At 215, base station 105-*a* may transmit random access message 2 (e.g., Msg 2). Random access message 2 may include control signaling (e.g., via a physical downlink control channel (PDCCH)) and a physical uplink shared channel (PDSCH) carrying a payload with the contents of the message. Random access message 2 may include a RACH preamble response. The RACH preamble response may include information for UE 115-*a*. For example, the RACH preamble response may include an uplink grant to UE 115-*a*, a temporary cell radio network temporary identifier (TC-RNTI), a resource block (RB) assignment, a modulation coding scheme (MCS) configuration, and the like. Additionally, base station 105-*a* may configure itself to receive random access message 3 (e.g., msg 3) using the information included in random access message 2. UE 115-*a* may receive random access message 2 and may decode random access message 2 (e.g., RACH preamble response) and obtain the information included in random access message 2. The included information may enable UE 115-*a* to transmit random access message 3 at 220.

At 220, UE 115-*a* may utilize information received in random access message 2 (e.g., the received TC-RNTI and uplink grant) to transmit a corresponding random access message 3 (e.g., on a PUSCH). Random access message 3 (e.g., Msg 3) may include a radio RRC connection request. Base station 105-*a* may receive random access message 3 and decode random access message 3 to generate random access message 4 (e.g., msg 4) using the received information (e.g., the RRC connection request).

At 225, base station 105-*a* may transmit random access message 4 (e.g., Msg 4). In some examples, random access message 4 may include RRC connection setup information. Random access message 4 may include control signaling (e.g., on a PDCCH) and data for the random access message (e.g., on a PDSCH). Random access message 4 may also include a cell radio network temporary identifier (CRNTI) for future communication with UE 115-*a*. For instance, after random access message 4, UE 115-*a* and base station 105-*a* may communicate using the CRNTI. UE 115-*a* may monitor for PDCCH during a contention resolution window. The contention resolution window may be configured by base station 105-*a* (e.g., via system information), and may have a duration of a number of slots (e.g., 8-64 slots).

At 230, UE 115-*a* may transmit a hybrid automatic request (HARQ) message (e.g., an acknowledgement (ACK) message or a negative acknowledgement (NACK) message) to base station 105-*a* indicating whether UE 115-*a* successfully received random access message 4 at 225. In some examples, UE 115-*a* may be configured to transmit an ACK message in the case of a successful reception of random access message 4, but UE 115-*a* may not support transmission of a NACK message in the case of unsuccessful reception of random access message 4. In such examples, base station 105-*a* may determine whether UE 115-*a* has received random access message 4 based on receiving or not receiving an ACK message on HARQ resources reserved for an ACK message.

At 235, base station 105-*a* may transmit an RRC connection setup message including control information on a PDCCH and a data message on a PDSCH. The RRC connection setup message may be associated with a TC-RNTI of UE 115-*a*.

In some examples, PDCCH monitoring during a four-step random access procedure may expend power. UE 115-*a* may perform multiple random access procedures over time, expending power and decreasing battery life during each procedure. In some examples, (e.g., if UE 115-*a* is a RedCap UE, an IWS, a sensor, a surveillance camera, or the like), UE 115-*a* may perform multiple random access procedures as a result of sparse or irregular transmissions, each of which relies on a successfully completed random access procedure prior to transmission. IN some examples, UE 115-*a* may experience limited coverage. For instance, UE 115-*a* may be a small device (e.g., a smart watch or wearable device) equipped with smaller antennas than a standard or full-size UE 115, resulting in out-of-coverage scenarios due to UE mobility and an increased number of random access procedures to re-establish connection. Thus, techniques for reduced PDCCH monitoring during random access procedures may result in decreased power expenditures, increased battery life, and improved user experience.

In some examples, UE 115-*a* may conserve power, without risking missed PDCCH transmissions, by implementing a RTT timer during which it does not monitor the PDCCH. The UE may initiate the timer after transmitting a random access message 1 at 210, as described in greater detail with reference to FIG. 4. In some examples, UE 115-*a* may initiate the timer after transmitting random access message 3 at 220, or after transmitting a retransmission of the random access message 3, as described in greater detail with reference to FIG. 5. In some examples, UE 115-*a* may initiate the timer after a PUCCH resources for HARQ feedback for random access message 4 (e.g., a HARQ resources for HARQ message at 230 in the case of unsuccessful reception of random access message 4 at 225) as described in greater detail with reference to FIG. 6.

In some examples, a UE 115-*a* and base station 105-*a* may perform a two-step random access procedure described with reference to FIG. 3.

Figure 3:
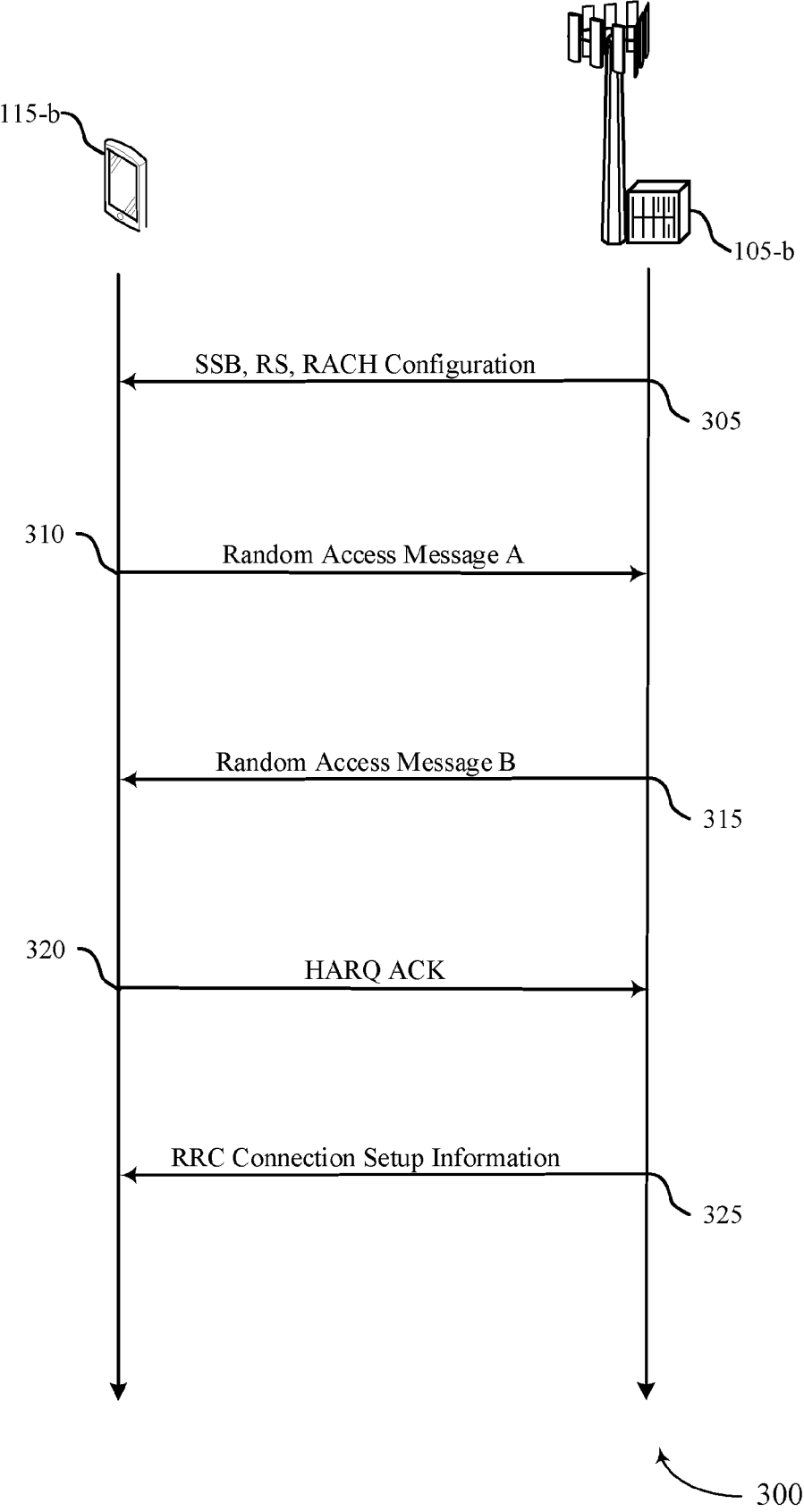
FIG. 3 illustrates an example of a process flow that supports reduced control channel monitoring for random access procedures in accordance with aspects of the present disclosure.

FIG. 3 illustrates an example of a process flow 300 that supports reduced control channel monitoring for random access procedures in accordance with aspects of the present disclosure. In some examples, process flow 300 may implement aspects of wireless communications system 100. Process flow 300 may include a UE 115-*b*, and a base station 105-*b*, which may be examples of corresponding devices described with reference to FIGS. 1 and 2.

UE 115-*b* may establish a communication link between UE 115-*b* and base station 105-*b* by a two-step random access procedure. In such cases, UE 115-*b* may transmit a first random access message (e.g., message A) and base station 105-*b* may transmit a second random access message (e.g., message B).

In some examples, UE 115-*b* may select a beam for transmitting message A (e.g., at 310) based on receiving one or more SSBs. For instance, UE 115-*b* may perform a beam search procedure. UE 115-*b* may monitor for and receive multiple SSBs transmitted by base station 105-*b* on different beams. UE 115-*a* may perform one or more measurements on the received SSBs (e.g., RSRP measurements, RSRQ measurements, or the like). UE 115-*b* may select a preferred beam of the various beams, and may select a PRACH resource corresponding to the preferred beam on which to transmit random access message A. In some examples, UE 115-*b* may program an uplink beam in radio frequency for one or more symbols based on the measurement procedure. Base station 105-*b* may be able to determine which of the beams is the preferred beam based on which PRACH resources over which base station 105-*b* receives random access message 1.

At 305, base station 105-*a* may transmit configuration information to UE 115-*a*. The configuration information may include SSB configuration (e.g., including resource allocation for SSBs, timing information, an indication of beams associated with respective SSBs, or the like), reference signal configuration information, PRACH configuration, or the like. In some examples, base station 105-*a* may transmit the configuration information in system information, RRC signaling, or the like. In some examples, configuration information 305 or another configuration message may include channel quality threshold information, channel quality threshold measurement difference threshold information, or the like.

At 310, UE 115-*b* may transmit a random access message A, (e.g., Msg A), to base station 105-*b*. UE 115-*b* may transmit random access message A on the selected PRACH resources, and may program a transmit beam in radio frequency for one or more symbols to transmit random access message A. Random access message A may combine the contents of a random access message 1 and random access message 3 from a four-step random access procedure (e.g., the four-step random access procedure described with reference to FIG. 2). In some cases, random access message A may include a RACH preamble (e.g., random access message 1 from FIG. 2) and a PUSCH carrying a payload with the contents of the message (e.g., random access message 3 from FIG. 2). In some cases, the preamble and the payload of random access message A may be transmitted on separate waveforms. Random access message A may include a preamble portion (e.g., a RACH preamble as described in FIG. 2) and a payload portion (e.g., a PUSCH payload).

At 315, base station 105-*b* may transmit a random access message B (e.g., Msg B). For instance, base station 105-*b* may transmit a downlink control signal (e.g., on a PDCCH) and a corresponding second random access message (e.g., random access message B) on a PDSCH to UE 115-*b*, where random access message B may combine the equivalent contents of a random access message 2 and message 4 from four-step random access procedure (e.g., random access message 2 and random access message 4 of FIG. 2). In some examples of two-step random access procedures, base station 105-*b* may transmit message B using either broadcast methods (e.g., targeting multiple UEs including UE 115-*b*) or unicast methods (e.g., targeting one or more specific UEs such as at least UE 115-*b*). Random access message B may include multiple portions or information, or both. For example, random access message B may include a preamble response portion, a contention resolution portion, an RRC connection setup message, or a combination thereof. Random access message B may also include other information provided by base station 105-*b* to UE 115-*b*, such as timing advance information. UE 115-*b* may monitor for random access message B during a response window (e.g., Msg B response window). The response window may be configured by base station 105-*b* (e.g., via system information), and may have a duration of a number of slots (e.g., 1-320 slots). If random access message B is with C-RNTI, UE 115-*b* may feedback ACK or NACK messages, (e.g., if a time alignment timer is running). Such cases are described in greater detail with reference to FIG. 7. If Msg B PDCCH is with Msg B-RNTI, then UE 115-*b* may not transmit any HARQ feedback (e.g., there may not be a PUCCH resource for HARQ feedback available for transmitting HARQ feedback for Msg B). Such cases are described in greater detail with reference to FIG. 8.

At 320, UE 115-*b* may transmit a HARQ message (e.g., an ACK message or a NACK message) to base station 105-*b* indicating whether UE 115-*b* successfully received random access message B at 315.

At 325, base station 105-*b* may transmit an RRC connection setup message including control information on a PDCCH and a data message on a PDSCH. The RRC connection setup message may be associated with a TC-RNTI of UE 115-*a*.

In some examples, PDCCH monitoring during a four-step random access procedure may expend power. UE 115-*b* may perform multiple random access procedures over time, expending power and decreasing battery life during each procedure. In some examples, (e.g., if UE 115-*b* is a RedCap UE, an IWS, a sensor, a surveillance camera, or the like), UE 115-*b* may perform multiple random access procedures as a result of sparse or irregular transmissions, each of which relies on a successfully completed random access procedure prior to transmission. In some examples, UE 115-*b* may experience limited coverage. For instance, UE 115-*b* may be a small device (e.g., a smart watch or wearable device) equipped with smaller antennas than a standard or full-size UE 115, resulting in out-of-coverage scenarios due to UE mobility and an increased number of random access procedures to re-establish connection. Thus, techniques for reduced PDCCH monitoring during random access procedures may result in decreased power expenditures, increased battery life, and improved user experience.

In some examples, to conserve power without risking missed PDCCH transmissions, UE 115-*b* may implement a timer (e.g., an RTT timer) during which it does not monitor the PDCCH. UE 115-*b* may initiate the timer after transmitting a random access message A at 310, as described in greater detail with reference to FIG. 7. In some examples, UE 115-*b* may initiate the timer after a PUCCH resource for HARQ feedback for random access message B (e.g., after a PUCCH resource for HARQ ACK at 320 in case of unsuccessful reception of random access message B) as described in greater detail with reference to FIG. 7. In some examples, UE 115-*b* may initiate the timer after a fixed offset after a last PDSCH resource for random access message B (e.g., in the case where HARQ resources are not configured for random access message B) as described in greater detail with reference to FIG. 8.

Figure 4:
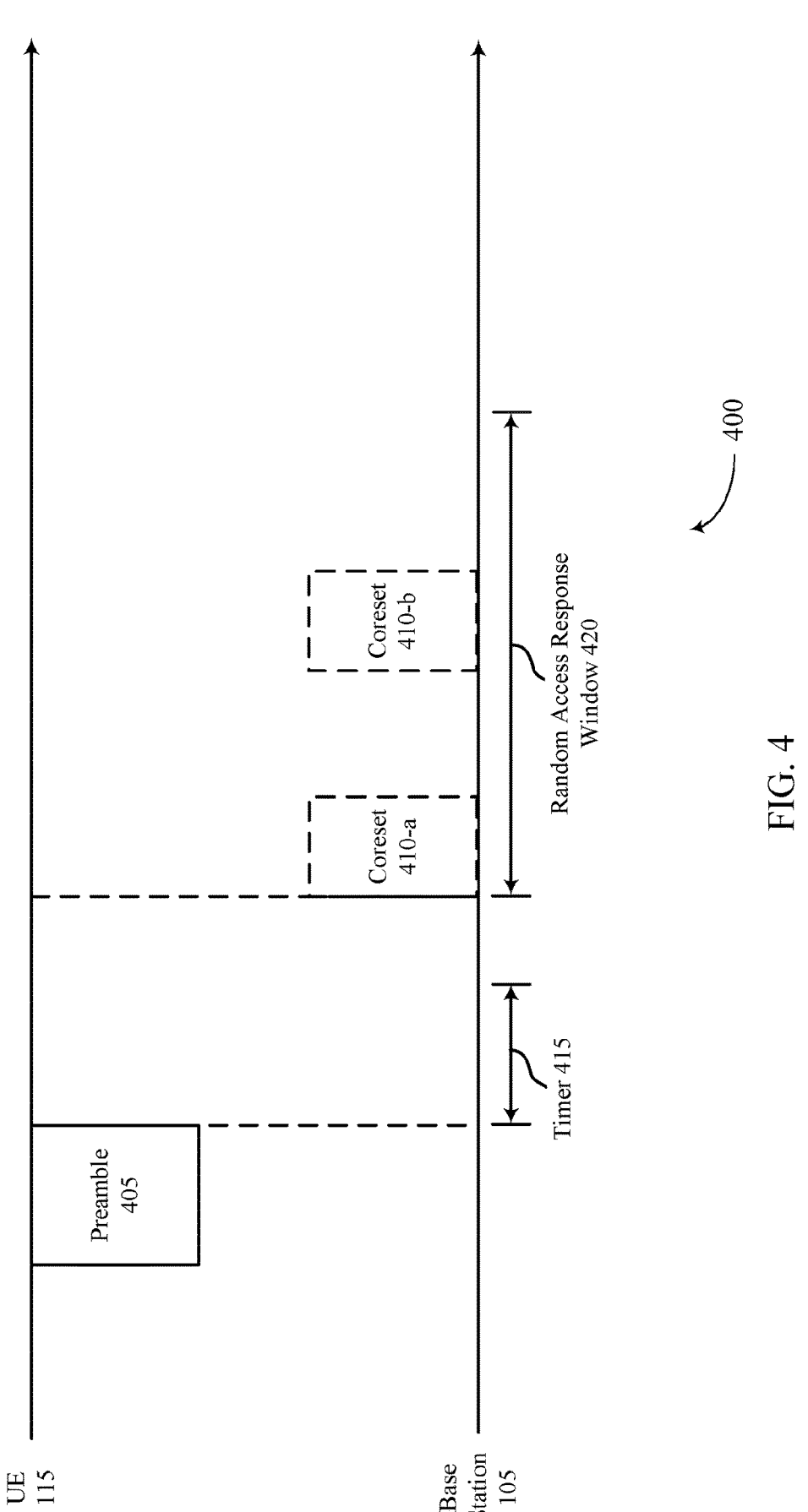
FIG. 4 illustrates an example of a timeline that supports reduced control channel monitoring for random access procedures in accordance with aspects of the present disclosure.

FIG. 4 illustrates an example of a timeline 400 that supports reduced control channel monitoring for random access procedures in accordance with aspects of the present disclosure. In some examples, timeline 400 may implement or may be implemented by a UE and a base station, which may be examples of corresponding devices described with reference to FIGS. 1-3. For instance, the UE 115 described with reference to FIG. 4 may be an example of a RedCap UE 115. UE 115 may transmit a first random access message during a random access procedure, may initiate timer 415 after transmitting the first random access message, and may monitor a PDCCH for a control message as part of the random access procedure upon expiration of timer 415. For instance, the first random access message may be a first message of a four-step random access message as described with reference to FIG. 2, and the control message may be second message (e.g., a Msg 2 PDCCH with RA-RNTI or C-RNTI) in the four-step random access procedure.

UE 115 may transmit preamble 405 (e.g., Msg 1) to base station 105. After transmitting preamble 405, UE 115 may initiate timer 415 (e.g., a Msg 1 RTT timer). Timer 415 may be an RTT timer equal to or based on an RTT between UE 115 and base station 105. In some examples, timer 415 may have a duration equal to or based at least in part on an RTT, and additional timer used by base station 105 to process preamble 405 and prepare for transmission (e.g., configure one or more antennas or antenna ports, etc.) of a second random access message (e.g., Msg 2). UE 115 may not monitor the PDCCH for the second random access message for the duration of timer 415.

UE 115 may initiate random access response window 420 at the first symbol (e.g., the starting symbol boundary) of a first coreset 410 after expiration of timer 415. For example, UE 115 may initiate random access response window 420 at the first symbol of coreset 410-*a* (e.g., the earliest CORE-SET for msg 2 PDCCH monitoring after expiration of timer 415). UE 115 may perform PDCCH monitoring during random access response window 420, and may receive the second random access message (e.g., a random access response (RAR)) on coreset 410-*a*, coreset 410-*b*, or any combination thereof.

In some examples, UE 115 may initiate the timer after transmitting or retransmitting a third random access message, as described in greater detail with reference to FIG. 5.

Figure 5:
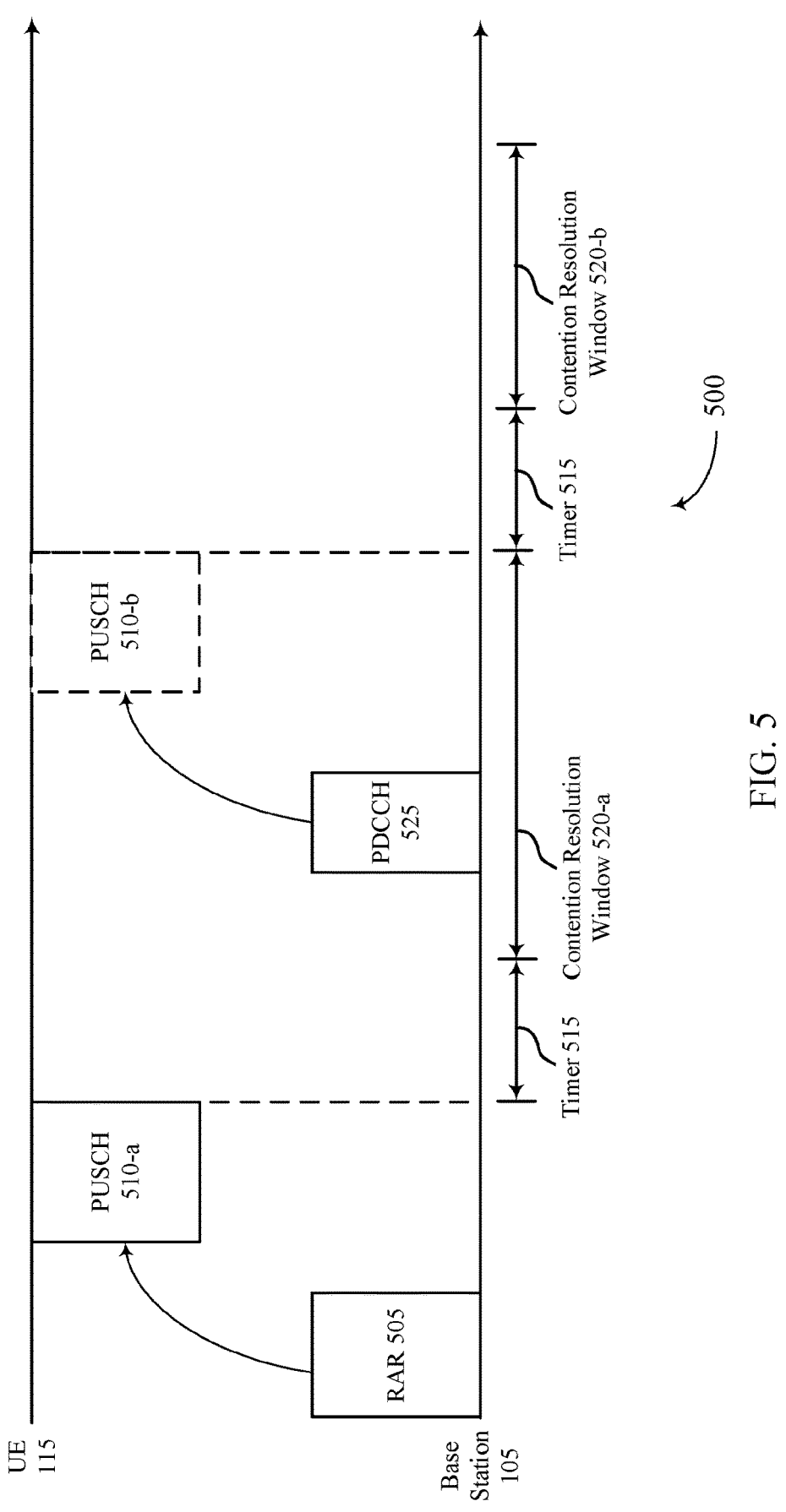
FIG. 5 illustrates an example of a timeline that supports reduced control channel monitoring for random access procedures in accordance with aspects of the present disclosure.

FIG. 5 illustrates an example of a timeline 500 that supports reduced control channel monitoring for random access procedures in accordance with aspects of the present disclosure. In some examples, timeline 500 may implement or may be implemented by a UE and a base station, which may be examples of corresponding devices described with reference to FIGS. 1-4. For instance, the UE 115 described with reference to FIG. 5 may be an example of a RedCap UE 115. UE 115 may transmit a first random access message during a random access procedure, may initiate timer 515 after transmitting the first random access message, and may monitor a PDCCH for a control message as part of the random access procedure upon expiration of timer 415. For instance, the first random access message may be a third message (Msg 3) or a retransmission of the third message (e.g., with TC-RNTI) of a four-step random access message as described with reference to FIG. 2, and the control message may be a downlink control information (DCI) message instructing UE 115 to send a retransmission of the third message.

In some examples, base station 105 may transmit RAR 505 to UE 115 during a four-step random access procedure. UE 115 may receive RAR 505, and may transmit a third message in the random access procedure (e.g., Msg 3) on PUSCH 510-*a*. After transmitting the third message, UE 115 may initiate timer 515 (e.g., a Msg 3 RTT timer). UE 115 may not perform PDCCH monitoring for the duration of timer 515. Timer 515 may be an example of timer 415 as described with reference to FIG. FIG. 4, or may be a different timer with a different value.

Contention resolution window 520-*a* may start when timer 515 expires. During contention resolution window 520-*a*, UE 115 may monitor for PDCCH signaling from base station 105. For instance, UE 115 may monitor PDCCH 525. In some examples, base station 105 may not successfully receive or decode the third message transmitted on PUSCH 510-*a*. In such examples, base station 105 may transmit a downlink message (e.g., a DCI) including an instruction for UE 115 to send a retransmission of the third message. In some examples, the DCI may include an uplink grant on PUSCH 510-*b*, or a trigger for preconfigured resources on PUSCH 510-*b*, or the like. The contention resolution window 520-*a* may have a duration from the expiration of timer 515 to the end of PUSCH 510-*b* (e.g., the end of the retransmission of the third message). There may be no overlap in time between the duration of timer 515 and contention resolution windows 520.

UE 115 may, in such examples, send a retransmission of the third message on PUSCH 510-*b*. After transmitting the retransmission of the third message on PUSCH 510-*b*, UE 115 may restart timer 515. For the duration of restarted timer 515, UE 115 may not perform PDCCH monitoring, resulting in increased power savings for UE 115. After restarted timer 515 expires, UE 115 may initiate contention resolution window 520-*b*. This process may be repeated as many times as necessary for base station 105 to successfully receive the third message (e.g., if base station 105 fails to receive the retransmission on PUSCH 510-*b*, then base station 105 may send another DCI message triggering another retransmission during a subsequent PDCCH during contention resolution window 520-*b*).

In some examples, UE 115 may initiate a timer after an indicated PUCCH resource for HARQ feedback, as described in greater detail with reference to FIG. 6.

Figure 6:
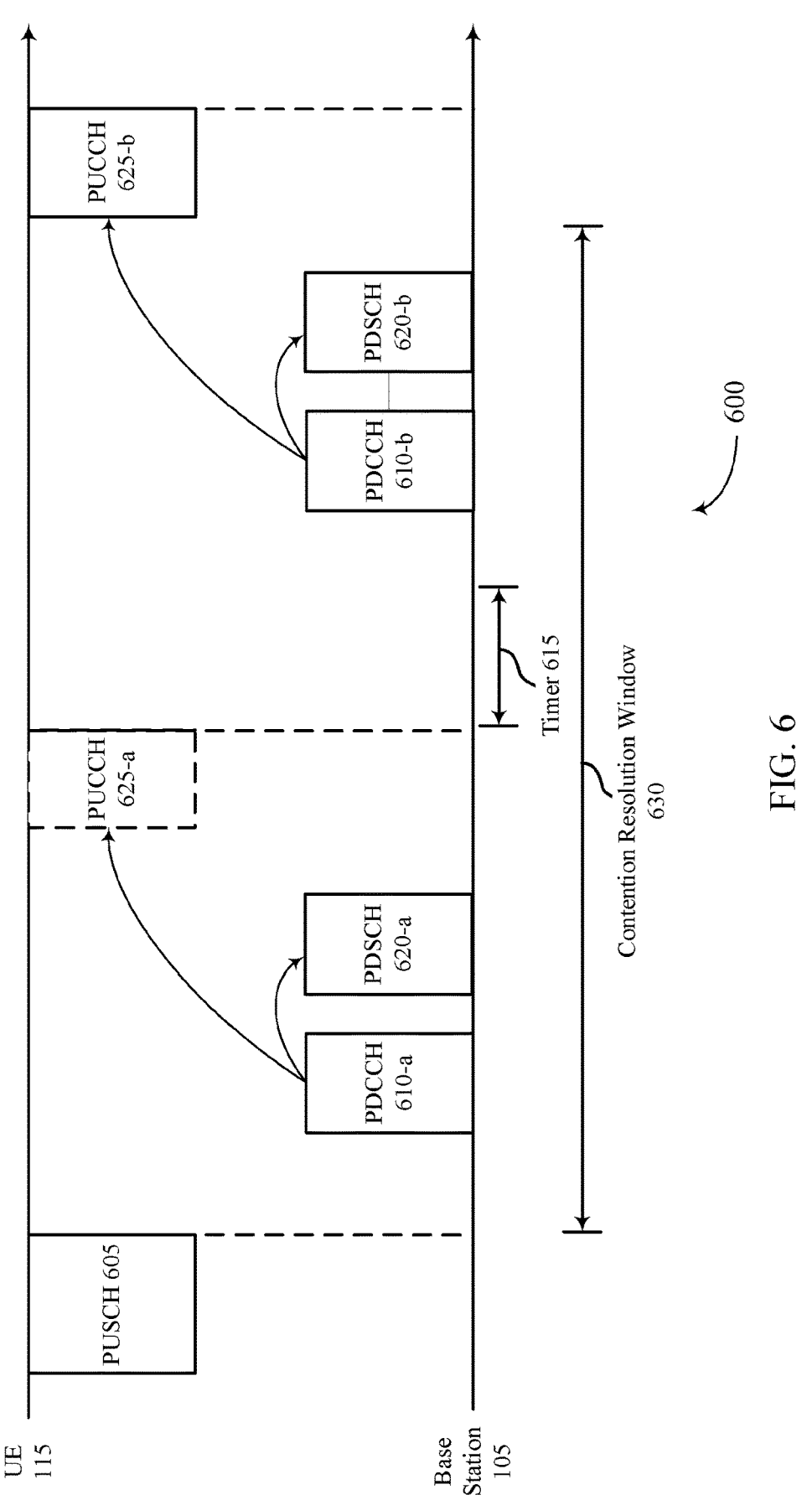
FIG. 6 illustrates an example of a timeline that supports reduced control channel monitoring for random access procedures in accordance with aspects of the present disclosure.

FIG. 6 illustrates an example of a timeline 600 that supports reduced control channel monitoring for random access procedures in accordance with aspects of the present disclosure. In some examples, timeline 600 may implement or may be implemented by a UE and a base station, which may be examples of corresponding devices described with reference to FIGS. 1-5. For instance, the UE 115 described with reference to FIG. 6 may be an example of a RedCap UE 115. UE 115 may transmit a first random access message during a random access procedure, may initiate timer 615 after transmitting the first random access message, and may monitor a PDCCH for a control message as part of the random access procedure upon expiration of timer 615. For instance, the first random access message may be a third message (Msg 3) (e.g., with TC-RNTI) of a four-step random access message as described with reference to FIG.

2, and the control message may be a retransmission of a fourth message (e.g., Msg 4) of the four-step random access procedure.

In some examples, UE 115 may reduce PDCCH (e.g., with TC-RNTI) monitoring by initiating timer 615 (e.g., a Msg 4 RTT timer) during a contention resolution window 630. UE 115 may transmit a third message in a random access procedure (e.g., Msg 3) on PUSCH 605. Upon transmitting the third message, UE 115 may initiate contention resolution window 630. UE 115 may monitor for a fourth message (e.g., Msg 4) of the random access procedure during contention resolution window 630. Base station 105 may transmit a control portion of the fourth message on PDCCH 610-*a*, and may transmit a data portion of the fourth message on PDSCH 620-*a*. In some examples, UE 115 may be configured with a PUCCH resource 625-*a* for HARQ feedback associated with the fourth message (e.g., base station 105 may include an indication of a location of PUCCH resource 625-*a* in the data portion of the fourth message transmitted on PDCCH 610-*a*). In some examples, PUCCH resource 625-*a* may not actually transmit anything on PUCCH resource 625-*a*. For example, PUCCH resource 625-*a* may be an ACK-only resource (e.g., UE 115 may transmit an ACK on PUCCH resource 625-*a* in the case of successful reception of the fourth message, but UE 115 may refrain from transmitting a NACK message in the case of unsuccessful reception of the fourth message).

In some examples, UE 115 may initiate timer 615 at the end of indicated PUCCH resource 625-*a* (e.g., after a last symbol boundary of PUCCH resource 625-*a*). In sch examples, for the duration of timer 615, UE 115 may not perform PDCCH monitoring (e.g., even during contention resolution window 630). After the expiration of timer 615, UE 115 may perform PDCCH monitoring. UE 115 may successfully receive a retransmission of the control portion of the fourth message on PDCCH 610-*b*, and may receive the data portion of the fourth message on PDSCH 620-*b*. Having successfully received the fourth message, UE 115 may transmit an ACK message on PUCCH resource 625-*b* (e.g., the location of which may be indicated by the control portion of the fourth message received on PDCCH 610-*b*).

In some examples, UE 115 may initiate a timer after transmitting a first message in a two-step random access procedure, or after a HARWQ feedback resource associated with a second message in the two-step random access procedure, or both, as described in greater detail with reference to FIG. 7.

Figure 7:
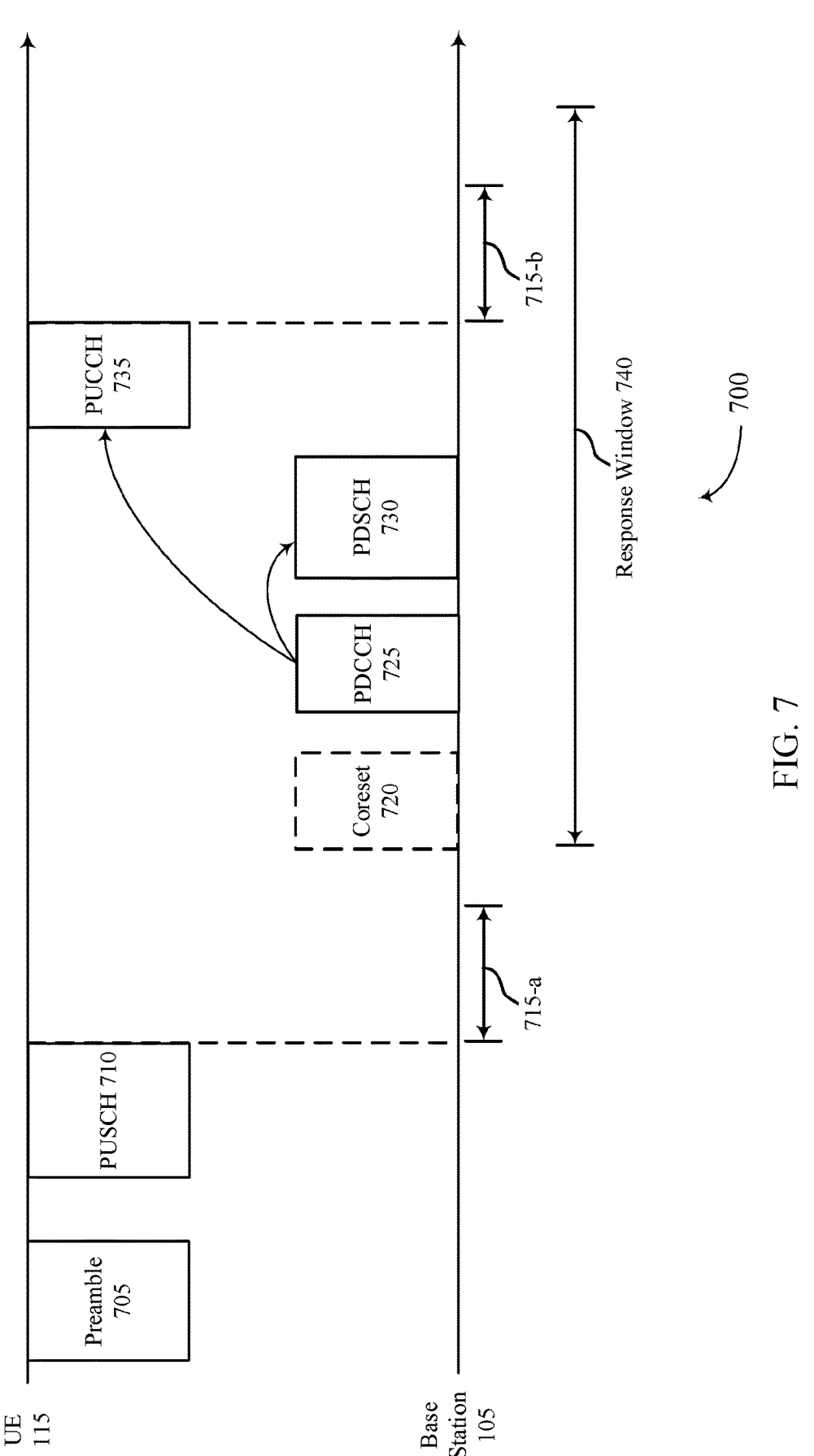
FIG. 7 illustrates an example of a timeline that supports reduced control channel monitoring for random access procedures in accordance with aspects of the present disclosure.

FIG. 7 illustrates an example of a timeline 700 that supports reduced control channel monitoring for random access procedures in accordance with aspects of the present disclosure. In some examples, timeline 700 may implement or may be implemented by a UE and a base station, which may be examples of corresponding devices described with reference to FIGS. 1-6. For instance, the UE 115 described with reference to FIG. 7 may be an example of a RedCap UE 115. UE 115 may transmit a first random access message during a random access procedure, may initiate timer 715 after transmitting the first random access message, and may monitor a PDCCH for a control message as part of the random access procedure upon expiration of timer 715. For instance, the first random access message may be a first message (Msg A) of a two-step random access message as described with reference to FIG. 3, and the control message may be a control portion of a second message (e.g., Msg B PDCCH with MsgB-RNTI or C-RNTI) of the two-step random access procedure. Additionally, or alternatively, the first random access message may be a first message (Msg A)

of the two-step random access procedure, and the control message may be a control portion of a retransmission of the second message (e.g., Msg B PDCCH with MsgB-RNTI or C-RNTI) of the two-step random access procedure.

In some examples, as part of a two-step random access procedure, UE 115 may transmit preamble 705 and a data portion of a first message (Msg A) of the two-step random access procedure on PUSCH 710. UE 115 may initiate timer 715-*a* (e.g., a Msg A RTT timer) after transmitting the first message of the random access procedure. For example, if there is a Msg A PUSCH 710, then UE 115 may initiate timer 715-*a* after transmitting the data portion of Msg A. If there is not a Msg A PUSCH 710, then UE 115 may initiate timer 715-*a* after preamble 705. Response window 740 may start at the first symbol of an earliest CORESET for Msg B PDCCH monitoring after expiration of timer 715-*a*. For example, response window 740 may start at a first symbol of Coreset 720 (e.g., even though base station 105 does not transmit a control portion of a second random access message (e.g., Msg B) until a subsequent CORESET 720). Base station 105 may transmit a second message of the random access procedure (e.g., Msg B) to UE 115. Base station 105 may transmit a control portion of Msg B on PDCCH 725, and may transmit a data portion of Msg B on PDSCH 730. In some examples, the control portion may include an indication of a location of a PUCCH resource 735 for HARQ feedback associated with Msg B. If UE 115 successfully receives Msg B, then UE 115 may transmit an ACK message on PUCCH resource 735.

In some examples, UE 115 may initiate a timer 715-*b* (e.g., a Msg B RTT timer). For example, UE 115 may restart timer 715-*a* or may start a separate timer associated with Msg B (e.g., that is not associated with Msg A). For example, UE 115 may not successfully receive or decode Msg B. If base station 105 indicates the location of PUCCH resource 735, UE 115 may transmit a NACK message to base station 105 on PUCCH resource 735 (or may refrain from transmitting an ACK message if NACK messages are not supported). UE 115 may initiate timer 715-*b* after a last symbol boundary of PUCCH resource 735. For the duration of timer 715-*b*, and even though response window 740 has not yet expired, UE 115 may not perform PDCCH monitoring. After expiration of timer 715-*b*, UE 115 may commence PDCCH monitoring for a retransmission of Msg B.

In some examples, base station 105 may not indicate a location of a PUCCH resource 735, or may not configure PUCCH resources for HARQ feedback associated with Msg A. In such examples, UE 115 may initiate a timer after a fixed offset from a PDSCH 730 of Msg B, as described in greater detail with reference to FIG. 8.

Figure 8:
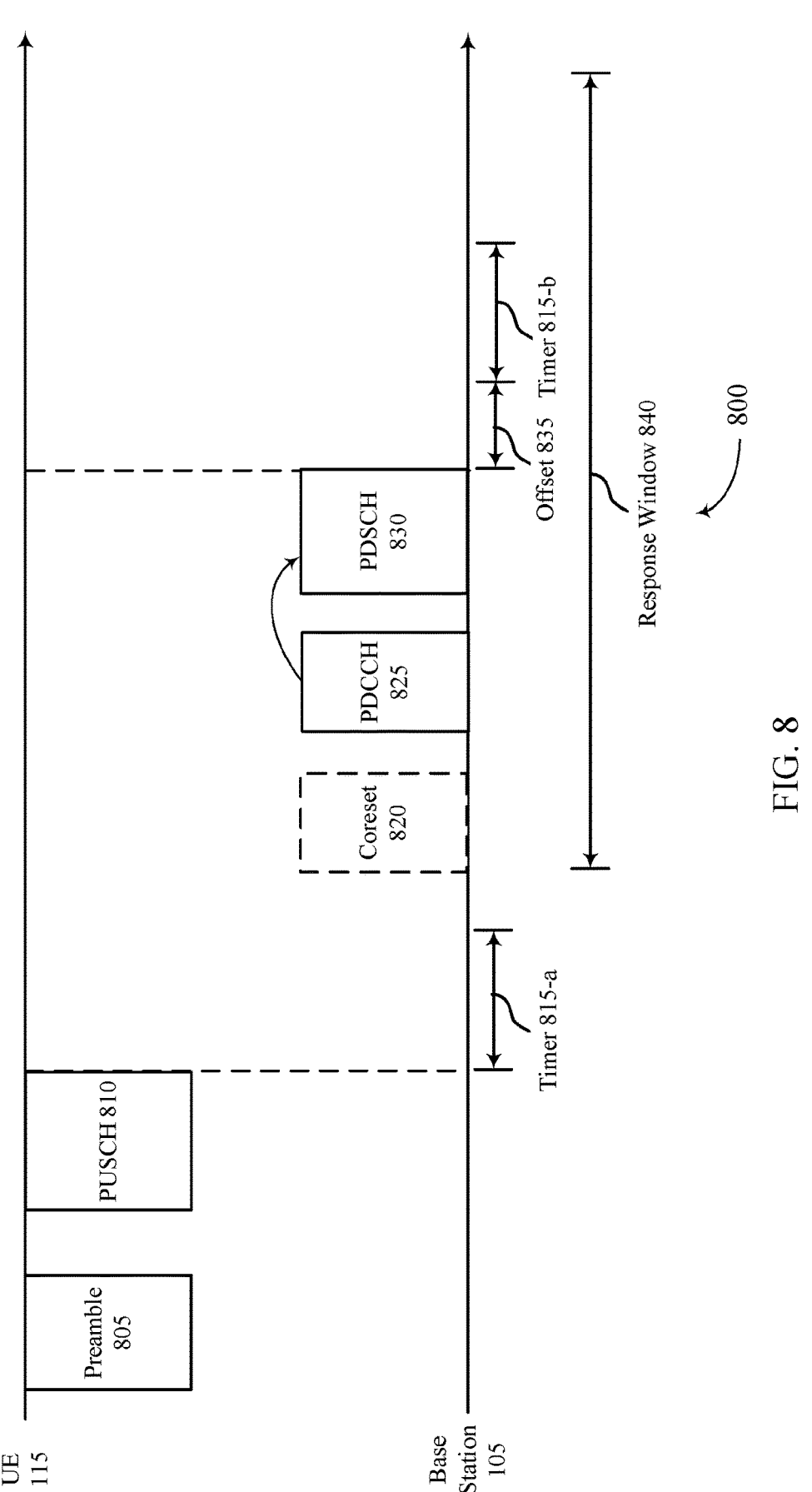
FIG. 8 illustrates an example of a timeline that supports reduced control channel monitoring for random access procedures in accordance with aspects of the present disclosure.

FIG. 8 illustrates an example of a timeline 800 that supports reduced control channel monitoring for random access procedures in accordance with aspects of the present disclosure. In some examples, timeline 800 may implement or may be implemented by a UE and a base station, which may be examples of corresponding devices described with reference to FIGS. 1-7. For instance, the UE 115 described with reference to FIG. 8 may be an example of a RedCap UE 115. UE 115 may transmit a first random access message during a random access procedure, may initiate timer 715 after transmitting the first random access message, and may monitor a PDCCH for a control message as part of the random access procedure upon expiration of timer 715. For instance, the first random access message may be a first message (Msg A) of the two-step random access procedure, and the control message may be a control portion of a retransmission of the second message (e.g., Msg B PDCCH with Msg B-RNTI or C-RNTI) of the two-step random access procedure.

In some examples, as part of a two-step random access procedure, UE 115 may transmit preamble 805 and a data portion of a first message (Msg A) of the two step random access procedure on PUSCH 810-a. UE 115 may initiate timer 815-a (e.g., a Msg A RTT timer) after transmitting the first message of the random access procedure. For example, if there is a Msg A PUSCH 810, then UE 115 may initiate timer 815-a after transmitting the data portion of Msg A. If there is not a Msg A PUSCH 810, then UE 115 may initiate timer 815-a after preamble 805. Response window 840 may start at the first symbol of an earliest CORESET for Msg B PDCCH monitoring after expiration of timer 815-a. For example, response window 840 may start at a first symbol of Coreset 820 (e.g., even though base station 105 does not transmit a control portion of a second random access message (e.g., Msg B) until a subsequent CORESET 820). Base station 105 may transmit a second message of the random access procedure (e.g., Msg B) to UE 115. Base station 105 may transmit a control portion of Msg B on PDCCH 825, and may transmit a data portion of Msg B on PDSCH 830.

In some examples, base station 105 may not configure or may not indicate a location of a PUCCH resource for HARQ feedback associated with Msg B. In such examples, UE 115 may apply a fixed offset 835 after a last symbol period of PDSCH 830 for Msg B. After fixed offset 835, UE 115 may initiate timer 815-b (e.g., a Msg B RTT timer). Timer 815-b may be the same as timer 815-a (e.g., UE 115 may restart timer 815-a), or may have a different duration than timer 815-a. For the duration of timer 815-b, UE 115 may not perform PDCCH monitoring for PDCCH with C-RNTI or Msg B RNTI (e.g., even if response window 840 has not yet expired).

In some examples, UE 115 may identify a value for one or more timers via downlink signaling (e.g., system information, downlink random access messages, previously indicated timers for other procedures, or the like), or may recommend values for timers during the random access procedure, etc., as described with reference to FIG. 9.

Figure 9:
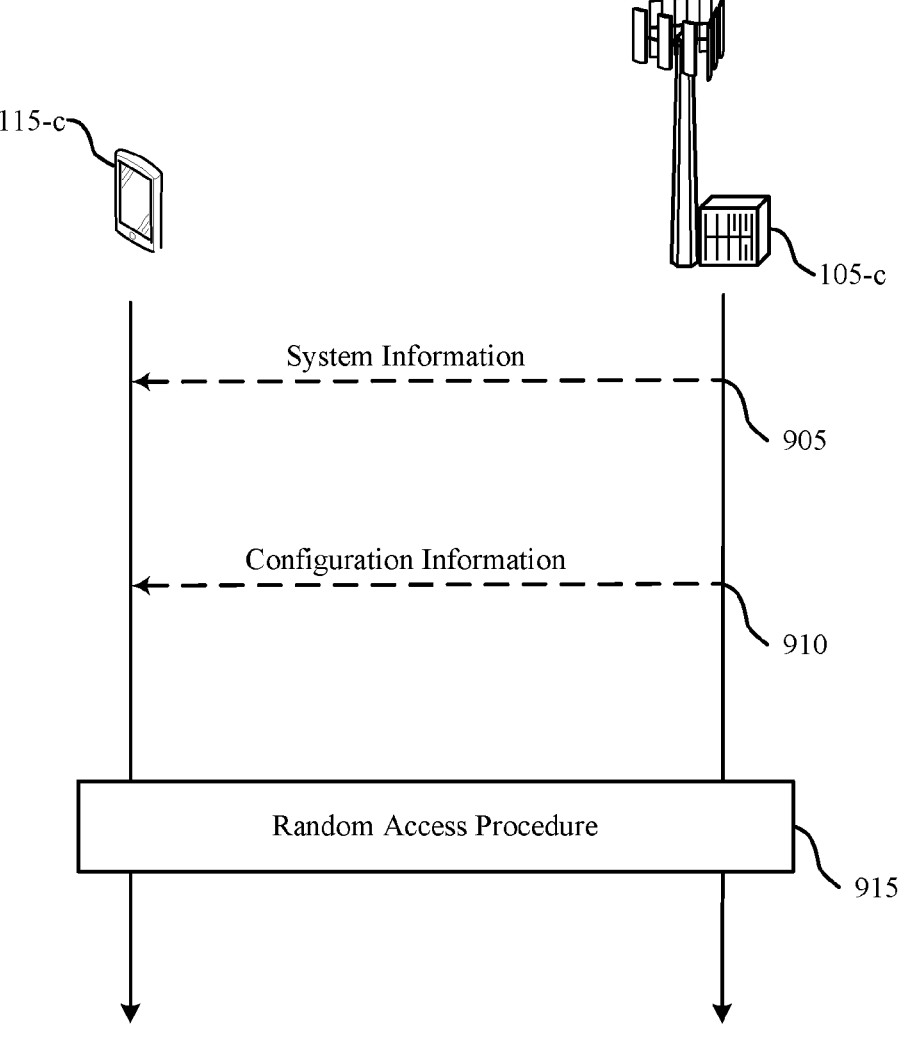
FIG. 9 illustrates an example of a process flow that supports reduced control channel monitoring for random access procedures in accordance with aspects of the present disclosure.

FIG. 9 illustrates an example of a process flow 900 that supports reduced control channel monitoring for random access procedures in accordance with aspects of the present disclosure. In some examples, process flow 900 may implement or may be implemented by a UE 115-c and a base station 105-c, which may be examples of corresponding devices described with reference to FIGS. 1-8. For instance, UE 115-c may be an example of a RedCap UE 115. UE 115-c and base station 105-c may perform one or more random access procedures (e.g., two-step random access procedures as described with reference to FIGS. 4-6, or four-step random access procedures as described with reference to FIGS. 7-8, or both).

In some examples, base station 105-c may provide an indication of one or more timers (e.g., RTT timers as described with reference to FIGS. 4-8) to UE 115-c via system information. For instance, at 905, base station 105-c may broadcast system information. The system information may include an indication of a single RTT timer duration, or of multiple different RTT timer durations. For instance, each RTT timer described herein (e.g., timer 415, timer 515, timer 615, timer 715-a, timer 715-b, timer 815-a, and timer 815-b) may have the same duration. The system information may include an indication of the timer duration, and UE 115-c may initiate the timer at various times during a random access procedure at 915. In some examples, each RTT timer duration may be different. For example, timer 415 may have a different duration than timer 515, which may be different than timer 615, etc. In some examples, subsets of timers have the same duration, while other timers have different durations. For instance, timer 415, timer 515, and timer 615 may have different values, or timer 715-a and timer 715-b may have the same value, or the like. Any timer described herein may have the same value or a different value than any other timer described herein. Indications of different timer values may be included in the system information.

In some examples, base station 105 may indicate a timer value for a different procedure, which UE 115-c may apply to the random access procedure at 915. For example, at 910, base station 105-c may transmit configuration information to UE 115-c. The configuration information may include information for, for example, a discontinuous reception cycle (DRX) configuration. The configuration information may include an indication of a timer for use in a DRX mode (e.g., a value of up to four slots). The UE may initiate the timer after transmitting an uplink control message before initiating a downlink retransmission timer, or as part of an uplink/downlink HARQ process, or the like. In some examples, UE 115-c may apply the timer indicated in the configuration information received at 910 to the DRX process, one or more HARQ processes, or the like. UE 115-c may also apply the timer to the random access procedure, as described in greater detail with reference to FIGS. 4-8.

In some examples, base station 105-c may indicate a duration of one or more timers during random access procedure 915. For example, base station 105-c may include an indication of a timer value in a downlink random access message. In a four-step random access procedure, base station 105-c may include an indication of a Msg 3 timer (e.g., timer 515 as illustrated with reference to FIG. 5) in a RAR message (e.g., RAR 505), or may include an indication of a Msg 4 timer (e.g., timer 615 as illustrated with reference to FIG. 6) in a RAR message.

In some examples, UE 115-a may identify a timer duration based on PRACH resources associated with the random access procedure. For instance, UE 115-c may transmit a first message to base station 105-c on one or more PRACH resources. In some examples, one or more PRACH resources may be dedicated for use by RedCap UEs. By selecting a PRACH resource for a RedCap UE, UE 115-c may identify a timer duration associated with the selected PRACH resource. The association between timer durations and PRACH resources may be standardized (e.g., in one or more standards documents), preconfigured or otherwise known at UE 115-c, or indicated to UE 115-c by base station 105-c (e.g., via higher layer signaling).

In some examples, UE 115-c may indicate or recommend a timer duration in an uplink random access message during the random access procedure at 915. For example, UE 115-c may include an indication of a timer duration or a UE capability indication (e.g., an indication that UE 115-c is a RedCap UE) in a Msg 3 of a four-step random access procedure. Such an indication may recommend a timer duration for a Msg 4 RTT timer (e.g., timer 615 as illustrated with reference to FIG. 6). In some examples, UE 115-c may include an indication of a timer duration or a UE capability indication (e.g., an indication that UE 115-c is a RedCap UE) in a data portion (e.g., on a PUSCH) of Msg A of a two-step random access procedure. Such an indication may recommend a timer duration for a Msg B RTT timer (e.g., timer 715-b or timer 815-b, as described in greater detail with reference to FIGS. 7 and 8, respectively).

Any of the techniques described herein with reference to FIG. 9 may rely on or otherwise interact with each other. For example, base station 105-*c* may configure UE 115-*c* with a timer duration (e.g., via system information, or configuration information, or the like). UE 115-*c* may utilize the initial configured timer value for a first message (e.g., Msg A, or Msg 1), and may recommend (e.g., via Msg A, Msg 1, or Msg 3) an updated timer value, or may be configured with an updated timer value (e.g., via a Msg 2) for use during a remainder of the random access procedure. UE 115-*c* may similarly implement various indications or recommendations of timer values in combination with each other.

Figure 10:
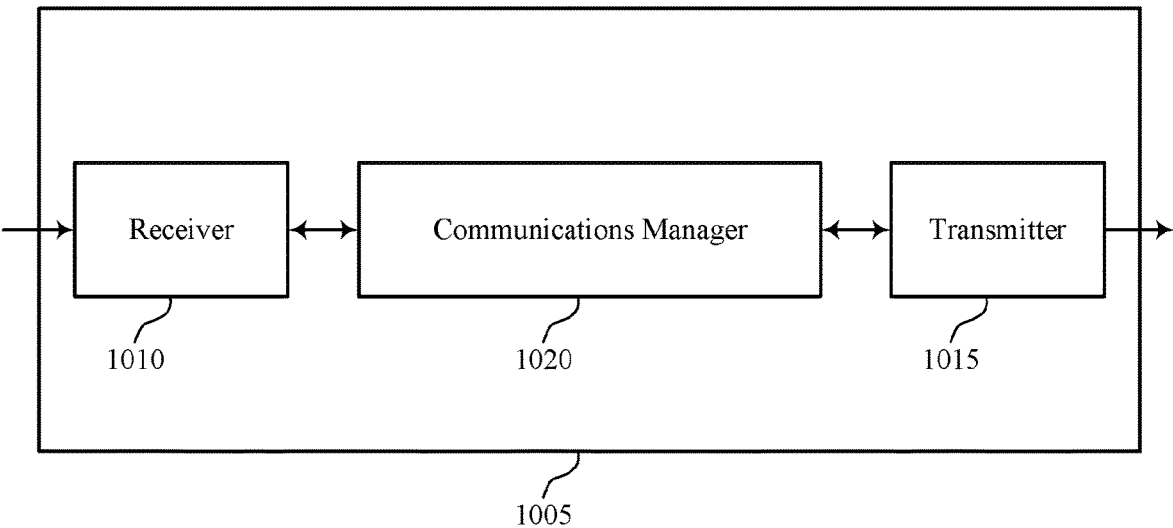
FIGS. 10 and 11 show block diagrams of devices that support reduced control channel monitoring for random access procedures in accordance with aspects of the present disclosure.

FIG. 10 shows a block diagram 1000 of a device 1005 that supports reduced control channel monitoring for random access procedures in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reduced control channel monitoring for random access procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reduced control channel monitoring for random access procedures). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of reduced control channel monitoring for random access procedures as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for transmitting, to a base station, a first random access message during a random access procedure. The communications manager 1020 may be configured as or otherwise support a means for initiating a timer after transmitting the first random access message. The communications manager 1020 may be configured as or otherwise support a means for monitoring, upon expiration of the timer, a physical downlink channel for a control message as part of the random access procedure. The communications manager 1020 may be configured as or otherwise support a means for receiving, during the random access procedure, the control message on the physical downlink channel.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for implementing timers during random access procedures to avoid excessive or unnecessary PDCCH monitoring. Such techniques may result in increased power savings, increased battery life, improved flexibility of device deployment, and improved user experience. Additionally, such techniques may result in more efficient use of computational resources, decreased signaling overhead, and improved system efficiency.

Figure 11:
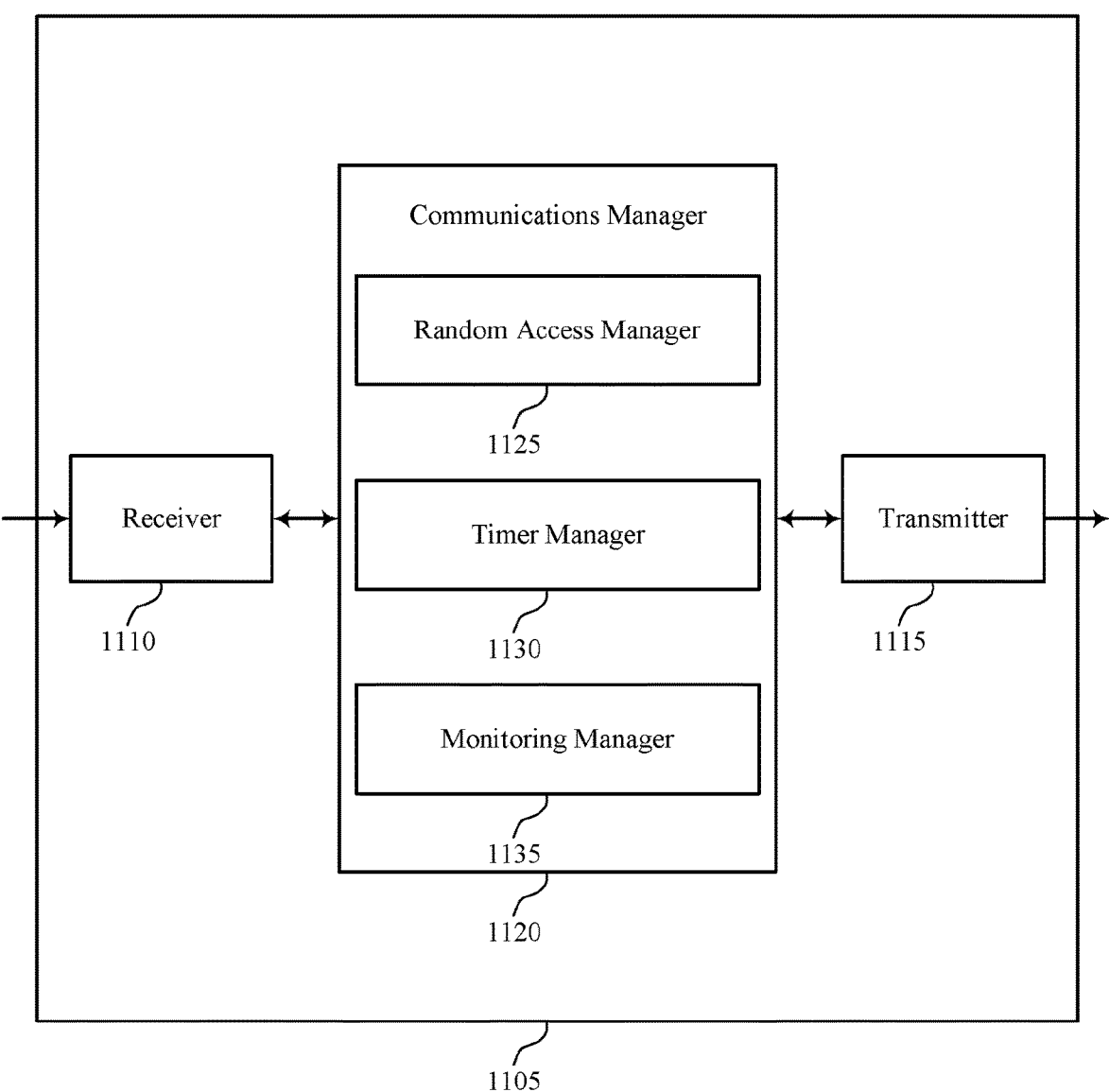

FIG. 11 shows a block diagram 1100 of a device 1105 that supports reduced control channel monitoring for random access procedures in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to reduced control channel monitoring for random access procedures). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to reduced control channel monitoring for random access procedures). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of reduced control channel monitoring for random access procedures as described herein. For example, the communications manager 1120 may include a random access manager 1125, a timer manager 1130, a monitoring manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The random access manager 1125 may be configured as or otherwise support a means for transmitting, to a base station, a first random access message during a random access procedure. The timer manager 1130 may be configured as or otherwise support a means for initiating a timer after transmitting the first random access message. The monitoring manager 1135 may be configured as or otherwise support a means for monitoring, upon expiration of the timer, a physical downlink channel for a control message as part of the random access procedure. The monitoring manager 1135 may be configured as or otherwise support a means for receiving, during the random access procedure, the control message on the physical downlink channel.

Figure 12:
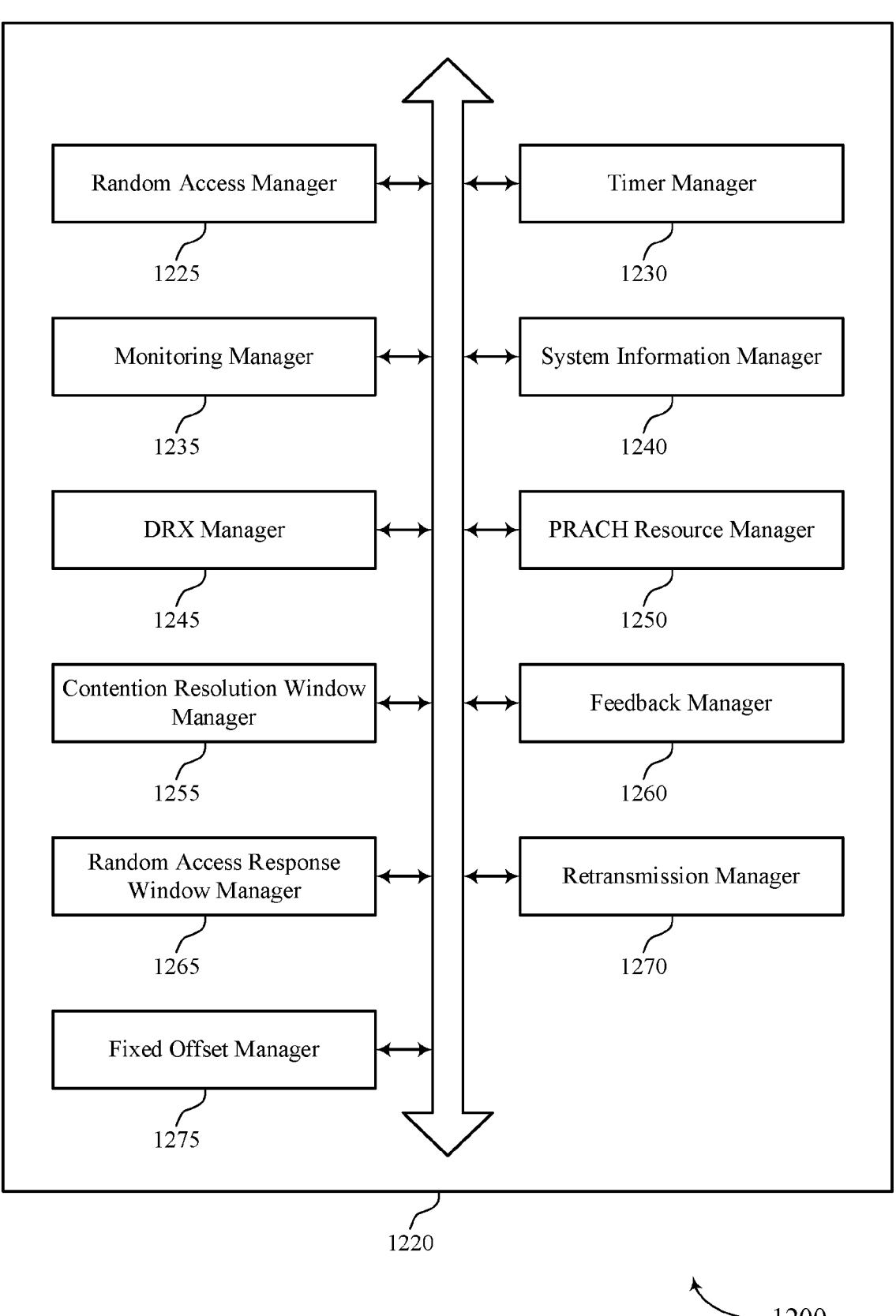
FIG. 12 shows a block diagram of a communications manager that supports reduced control channel monitoring for random access procedures in accordance with aspects of the present disclosure.

FIG. 12 shows a block diagram 1200 of a communications manager 1220 that supports reduced control channel monitoring for random access procedures in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of reduced control channel monitoring for random access procedures as described herein. For example, the communications manager 1220 may include a random access manager 1225, a timer manager 1230, a monitoring manager 1235, a system information manager 1240, a DRX manager 1245, a PRACH resource manager 1250, a contention resolution window manager 1255, a feedback manager 1260, a random access response window manager 1265, a retransmission manager 1270, a fixed offset manager 1275, or any combination thereof. Each of these components may communicate, directly or indirectly, with one another (e.g., via one or more buses).

The communications manager 1220 may support wireless communications at a UE in accordance with examples as disclosed herein. The random access manager 1225 may be configured as or otherwise support a means for transmitting, to a base station, a first random access message during a random access procedure. The timer manager 1230 may be configured as or otherwise support a means for initiating a timer after transmitting the first random access message. The monitoring manager 1235 may be configured as or otherwise support a means for monitoring, upon expiration of the timer, a physical downlink channel for a control message as part of the random access procedure. In some examples, the monitoring manager 1235 may be configured as or otherwise support a means for receiving, during the random access procedure, the control message on the physical downlink channel.

In some examples, the timer manager 1230 may be configured as or otherwise support a means for refraining from monitoring for the control message for a duration of the timer.

In some examples, the random access manager 1225 may be configured as or otherwise support a means for transmitting the first random access message includes transmitting a first message of a four-step random access procedure. In some examples, the monitoring manager 1235 may be configured as or otherwise support a means for monitoring for the control message includes monitoring for a second random access message of the four-step random access procedure.

In some examples, the timer manager 1230 may be configured as or otherwise support a means for initiating, at a first transmission time interval boundary of a next control resource set after expiration of the timer, a random access response monitoring window, where the monitoring occurs during the random access response monitoring window.

In some examples, transmitting the first random access message includes transmitting a third message of a four-step random access procedure. In some examples, monitoring for the control message includes monitoring for a scheduling downlink control information message instructing the UE to send a retransmission of the third message of the four-step random access procedure.

In some examples, the contention resolution window manager 1255 may be configured as or otherwise support a means for initiating, upon expiration of the timer, a contention resolution window, where the monitoring occurs during the contention resolution window.

In some examples, the retransmission manager 1270 may be configured as or otherwise support a means for receiving the scheduling downlink control information message instructing the UE to send the retransmission of the third message of the four-step random access procedure. In some examples, the retransmission manager 1270 may be configured as or otherwise support a means for transmitting, during the contention resolution window, the retransmission of the third message of the four-step random access procedure. In some examples, the timer manager 1230 may be configured as or otherwise support a means for restarting the timer after transmitting the retransmission of the third message of the four-step random access procedure and upon expiration of the contention resolution window. In some examples, the contention resolution window manager 1255 may be configured as or otherwise support a means for initiating, upon expiration of the restarted timer, a second contention resolution window. In some examples, the monitoring manager 1235 may be configured as or otherwise support a means for monitoring, during the second contention resolution window, the physical downlink channel for a second control message as part of the random access procedure. In some examples, transmitting the first random access message includes transmitting a third message of a four-step random access procedure. In some examples, monitoring for the control message includes monitoring for a retransmission of a fourth message of the four-step random access procedure.

In some examples, the contention resolution window manager 1255 may be configured as or otherwise support a means for initiating a contention resolution window after transmitting the third message of the four-step random access procedure. In some examples, the monitoring manager 1235 may be configured as or otherwise support a means for monitoring, during the contention resolution window, for the fourth message of the four-step random access procedure. In some examples, the random access manager 1225 may be configured as or otherwise support a means for determining, based on the monitoring, that the UE has failed to receive the fourth message of the four-step random access procedure. In some examples, the feedback manager 1260 may be configured as or otherwise support a means for identifying an uplink control resource allocated for transmitting feedback information to the base station. In some examples, the feedback manager 1260 may be configured as or otherwise support a means for refraining from transmitting a feedback message indicating that the UE has successfully received the third message of the four-step random access procedure on the uplink control resource, where monitoring for the retransmission of the fourth message of the four-step random access procedure is based on refraining from transmitting the feedback message.

In some examples, the timer manager 1230 may be configured as or otherwise support a means for initiating the timer during the contention resolution window after a last transmission time interval boundary of the uplink control resource. In some examples, transmitting the first random access message includes transmitting a first message of a two-step random access procedure. In some examples, monitoring for the control message includes monitoring for a second random access message of the two-step random access procedure.

In some examples, the random access response window manager 1265 may be configured as or otherwise support a means for initiating, at a first transmission time interval boundary of a next control resource set after expiration of the timer, a random access response monitoring window, where the monitoring occurs during the random access response monitoring window. In some examples, transmitting the first random access message includes transmitting a first message of a two-step random access procedure. In some examples, monitoring for the control message includes monitoring for a retransmission of a second message of the two-step random access procedure.

In some examples, the random access response window manager 1265 may be configured as or otherwise support a means for initiating, at a first transmission time interval boundary of a next control resource set after expiration of the timer, a random access response monitoring window. In some examples, the monitoring manager 1235 may be configured as or otherwise support a means for monitoring, during the random access response monitoring window, for the second message of the two-step random access procedure. In some examples, the random access manager 1225 may be configured as or otherwise support a means for determining, based on the monitoring, that the UE has failed to receive the second message of the two-step random access procedure. In some examples, the feedback manager 1260 may be configured as or otherwise support a means for transmitting, on an uplink control resource allocated for transmitting feedback information to the base station, a feedback message indicating that the UE has not received the second message of the two-step random access procedure.

In some examples, the random access response window manager 1265 may be configured as or otherwise support a means for initiating the timer during the random access response monitoring window after a last transmission time interval boundary of the uplink control resource.

In some examples, to support initiating the timer, the fixed offset manager 1275 may be configured as or otherwise support a means for identifying a fixed offset value. In some examples, to support initiating the timer, the fixed offset manager 1275 may be configured as or otherwise support a means for applying the fixed offset value after a last transmission time interval boundary of resources allocated for receiving the second message of the two-step random access procedure. In some examples, to support initiating the timer, the timer manager 1230 may be configured as or otherwise support a means for initiating the timer during the random access response monitoring window after the fixed offset value.

In some examples, the system information manager 1240 may be configured as or otherwise support a means for receiving, from the base station, system information including an indication of a duration of the timer.

In some examples, the timer manager 1230 may be configured as or otherwise support a means for receiving, in a previous random access message, an indication of a duration of the timer.

In some examples, the DRX manager 1245 may be configured as or otherwise support a means for receiving, from the base station, discontinuous reception configuration information, the discontinuous reception configuration information including an indication of a duration of the timer. In some examples, the DRX manager 1245 may be configured as or otherwise support a means for receiving, from the base station, an instruction to apply the timer to the random access procedure, where initiating the timer is based on receiving the instruction.

In some examples, the PRACH resource manager 1250 may be configured as or otherwise support a means for identifying one or more physical random access channel resources for transmitting the first random access message or a second random access message, where the identified one or more physical random access channel resources are associated with the timer, where initiating the timer is based on the identified one or more physical random access channel resources.

In some examples, the timer manager 1230 may be configured as or otherwise support a means for including, in the first random access message, an indication of a duration of the timer, where initiating the timer is based on including the indication of the duration of the timer in the first random access message. In some examples, the timer manager 1230 may be configured as or otherwise support a means for transmitting, to the base station, an indication that the UE is a reduced capacity UE, where initiating the timer is based on transmitting the indication.

In some examples, the UE is a reduced-capability UE.

Figure 13:
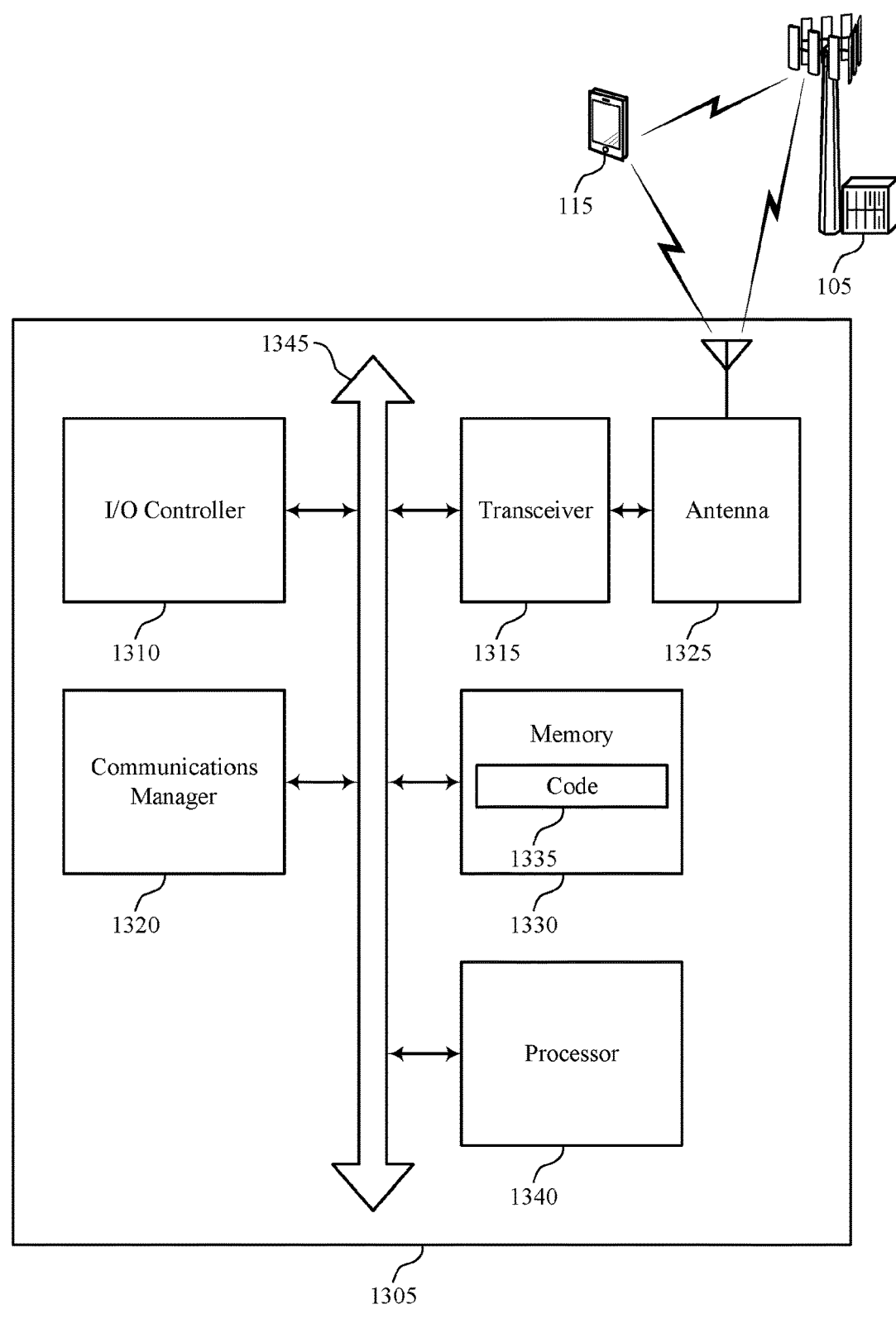
FIG. 13 shows a diagram of a system including a device that supports reduced control channel monitoring for random access procedures in accordance with aspects of the present disclosure.

FIG. 13 shows a diagram of a system 1300 including a device 1305 that supports reduced control channel monitoring for random access procedures in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting reduced control channel monitoring for random access procedures). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for transmitting, to a base station, a first random access message during a random access procedure. The communications manager 1320 may be configured as or otherwise support a means for initiating a timer after transmitting the first random access message. The communications manager 1320 may be configured as or otherwise support a means for monitoring, upon expiration of the timer, a physical downlink channel for a control message as part of the random access procedure. The communications manager 1320 may be configured as or otherwise support a means for receiving, during the random access procedure, the control message on the physical downlink channel.

By including or configuring the communications manager 1320 in accordance with examples as described herein, the device 1305 may support techniques for implementing timers during random access procedures to avoid excessive or unnecessary PDCCH monitoring. Such techniques may result in increased power savings, increased battery life, improved flexibility of device deployment, and improved user experience. Additionally, such techniques may result in more efficient use of computational resources, decreased signaling overhead, and improved system efficiency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of reduced control channel monitoring for random access procedures as described herein, or the processor 1340 and the memory 1330 may be otherwise configured to perform or support such operations.

Figure 14:
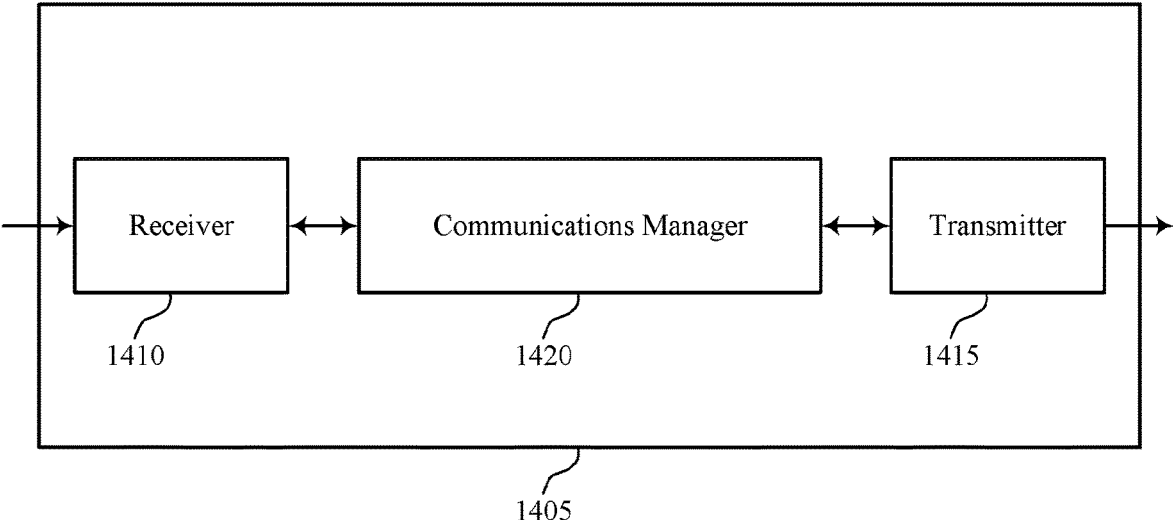
FIGS. 14 and 15 show block diagrams of devices that support reduced control channel monitoring for random access procedures in accordance with aspects of the present disclosure.

FIG. 14 shows a block diagram 1400 of a device 1405 that supports reduced control channel monitoring for random access procedures in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to reduced control channel monitoring for random access procedures). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to reduced control channel monitoring for random access procedures). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of reduced control channel monitoring for random access procedures as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. For example, the communications manager 1420 may be configured as or otherwise support a means for transmitting, to a UE, an indication of a timer during which the UE may refrain from monitoring for downlink control information on a physical downlink channel. The communications manager 1420 may be configured as or otherwise support a means for receiving, from the UE, a first random access message during a random access procedure. The communications manager 1420 may be configured as or otherwise support a means for transmitting, based on receiving the first random access message, a control message on the physical downlink channel.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for implementing timers during random access procedures to avoid excessive or unnecessary PDCCH monitoring. Such techniques may result in increased power savings, increased battery life, improved flexibility of device deployment, and improved user experience. Additionally, such techniques may result in more efficient use of computational resources, decreased signaling overhead, and improved system efficiency.

Figure 15:
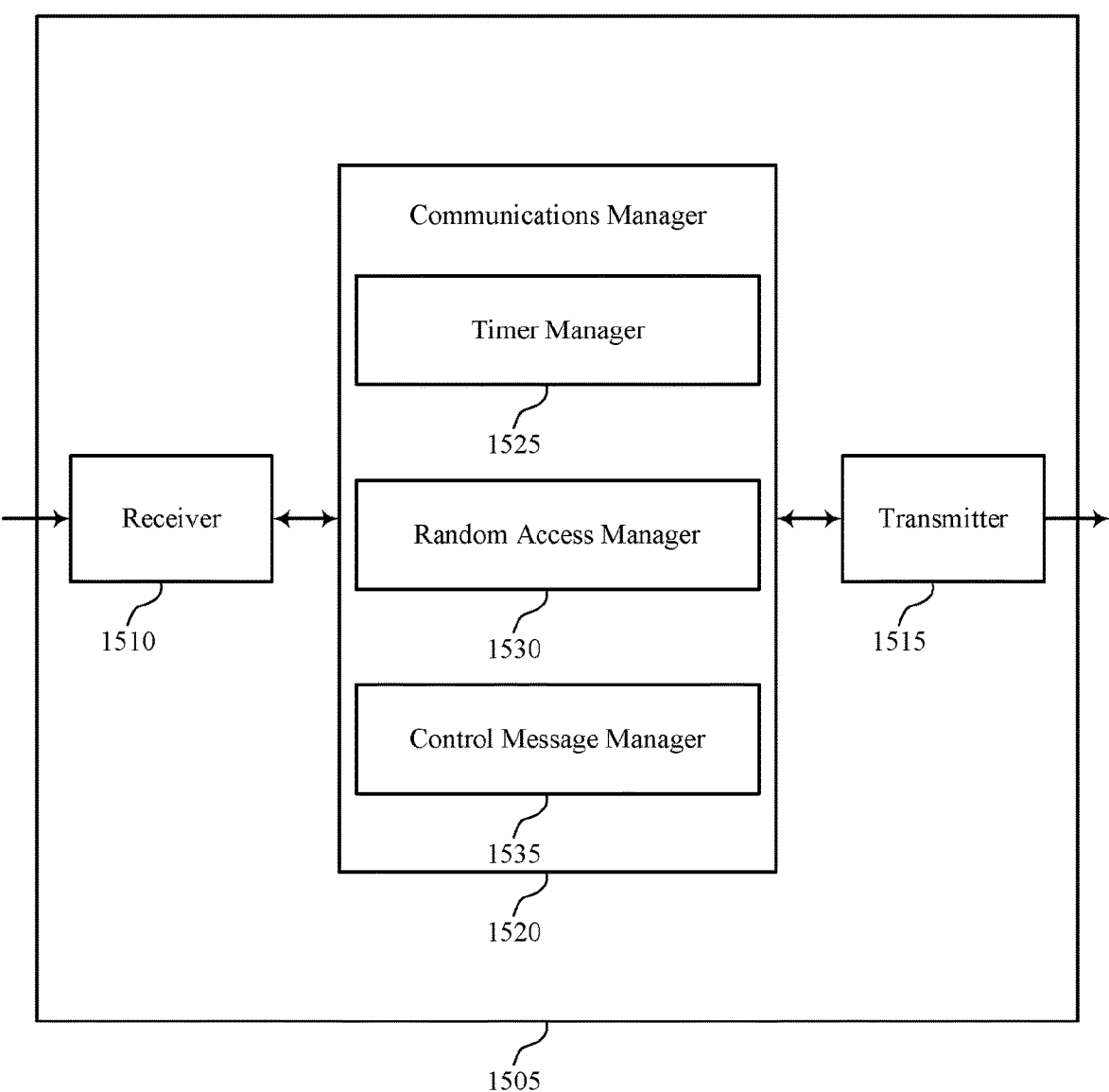

FIG. 15 shows a block diagram 1500 of a device 1505 that supports reduced control channel monitoring for random access procedures in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to reduced control channel monitoring for random access procedures). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to reduced control channel monitoring for random access procedures). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of reduced control channel monitoring for random access procedures as described herein. For example, the communications manager 1520 may include a timer manager 1525, a random access manager 1530, a control message manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a base station in accordance with examples as disclosed herein. The timer manager 1525 may be configured as or otherwise support a means for transmitting, to a UE, an indication of a timer during which the UE may refrain from monitoring for downlink control information on a physical downlink channel. The random access manager 1530 may be configured as or otherwise support a means for receiving, from the UE, a first random access message during a random access procedure. The control message manager 1535 may be configured as or otherwise support a means for transmitting, based on receiving the first random access message, a control message on the physical downlink channel.

Figure 16:
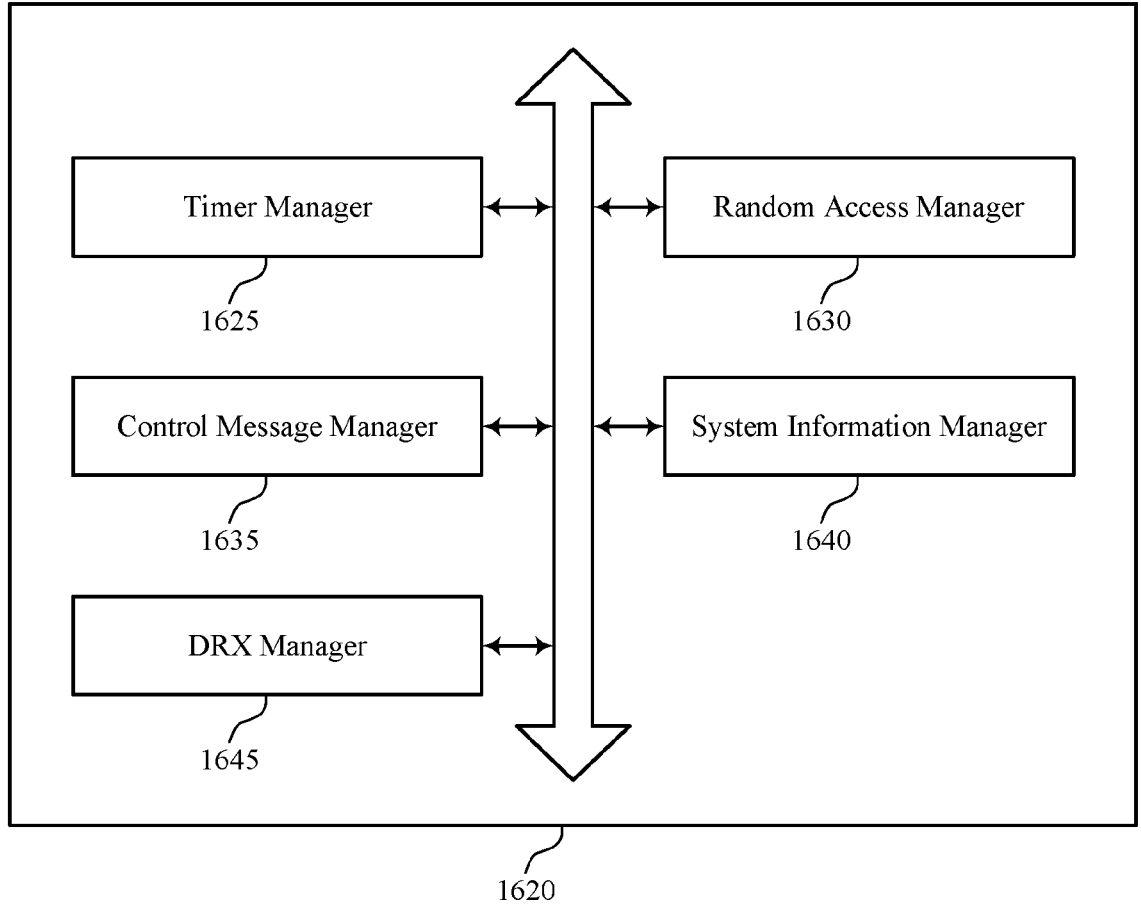
FIG. 16 shows a block diagram of a communications manager that supports reduced control channel monitoring for random access procedures in accordance with aspects of the present disclosure.

FIG. 16 shows a block diagram 1600 of a communications manager 1620 that supports reduced control channel monitoring for random access procedures in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of reduced control channel monitoring for random access procedures as described herein. For example, the communications manager 1620 may include a timer manager 1625, a random access manager 1630, a control message manager 1635, a system information manager 1640, a DRX manager 1645, or any combination thereof. Each of these components may communicate, directly or indirectly, with one another (e.g., via one or more buses).

The communications manager 1620 may support wireless communications at a base station in accordance with examples as disclosed herein. The timer manager 1625 may be configured as or otherwise support a means for transmitting, to a UE, an indication of a timer during which the UE may refrain from monitoring for downlink control information on a physical downlink channel. The random access manager 1630 may be configured as or otherwise support a means for receiving, from the UE, a first random access message during a random access procedure. The control message manager 1635 may be configured as or otherwise support a means for transmitting, based on receiving the first random access message, a control message on the physical downlink channel.

In some examples, to support transmitting the indication of the timer, the system information manager 1640 may be configured as or otherwise support a means for transmitting system information including the indication of the timer.

In some examples, to support transmitting the indication of the timer, the random access manager 1630 may be configured as or otherwise support a means for transmitting a second random access message prior to the first random access message, the second random access message including the indication of the timer.

In some examples, to support transmitting the indication of the timer, the DRX manager 1645 may be configured as or otherwise support a means for transmitting discontinuous reception configuration information, the discontinuous reception configuration information including the indication of the timer. In some examples, the DRX manager 1645 may be configured as or otherwise support a means for transmitting, to the UE, an instruction to apply the timer to the random access procedure, where initiating the timer is based on receiving the instruction.

In some examples, the UE is a reduced-capability UE.

Figure 17:
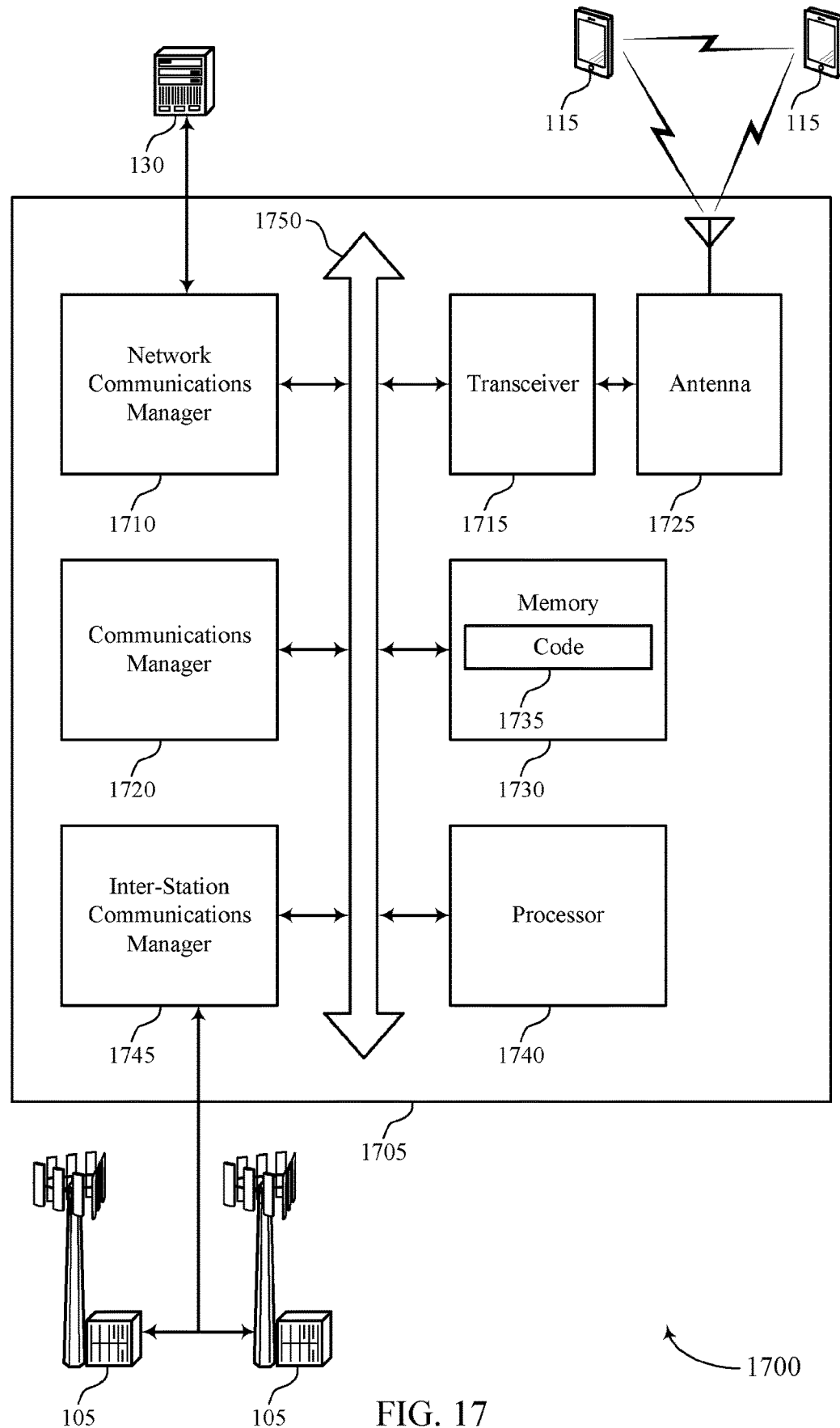
FIG. 17 shows a diagram of a system including a device that supports reduced control channel monitoring for random access procedures in accordance with aspects of the present disclosure.

FIG. 17 shows a diagram of a system 1700 including a device 1705 that supports reduced control channel monitoring for random access procedures in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an interstation communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting reduced control channel monitoring for random access procedures). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communications at a base station in accordance with examples as disclosed herein. For example, the communications manager 1720 may be configured as or otherwise support a means for transmitting, to a UE, an indication of a timer during which the UE may refrain from monitoring for downlink control information on a physical downlink channel. The communications manager 1720 may be configured as or otherwise support a means for receiving, from the UE, a first random access message during a random access procedure. The communications manager 1720 may be configured as or otherwise support a means for transmitting, based on receiving the first random access message, a control message on the physical downlink channel.

By including or configuring the communications manager 1720 in accordance with examples as described herein, the device 1705 may support techniques for implementing timers during random access procedures to avoid excessive or unnecessary PDCCH monitoring. Such techniques may result in increased power savings, increased battery life, improved flexibility of device deployment, and improved user experience. Additionally, such techniques may result in more efficient use of computational resources, decreased signaling overhead, and improved system efficiency.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of reduced control channel monitoring for random access procedures as described herein, or the processor 1740 and the memory 1730 may be otherwise configured to perform or support such operations.

FIG. 18 shows a flowchart illustrating a method 1800 that supports reduced control channel monitoring for random access procedures in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include transmitting, to a base station, a first random access message during a random access procedure. The operations of 1805 may be performed in accordance with examples as disclosed herein. In some examples, aspects of the operations of 1805 may be performed by a random access manager 1225 as described with reference to FIG. 12.

At 1810, the method may include initiating a timer after transmitting the first random access message. The operations of 1810 may be performed in accordance with examples as disclosed herein. In some examples, aspects of the operations of 1810 may be performed by a timer manager 1230 as described with reference to FIG. 12.

At 1815, the method may include monitoring, upon expiration of the timer, a physical downlink channel for a control message as part of the random access procedure. The operations of 1815 may be performed in accordance with examples as disclosed herein. In some examples, aspects of the operations of 1815 may be performed by a monitoring manager 1235 as described with reference to FIG. 12.

At 1820, the method may include receiving, during the random access procedure, the control message on the physical downlink channel. The operations of 1820 may be performed in accordance with examples as disclosed herein. In some examples, aspects of the operations of 1820 may be performed by a monitoring manager 1235 as described with reference to FIG. 12.

FIG. 19 shows a flowchart illustrating a method 1900 that supports reduced control channel monitoring for random access procedures in accordance with aspects of the present disclosure. The operations of the method 1900 may be implemented by a base station or its components as described herein. For example, the operations of the method 1900 may be performed by a base station 105 as described with reference to FIGS. 1 through 9 and 14 through 17. In some examples, a base station may execute a set of instructions to control the functional elements of the base station to perform the described functions. Additionally, or alternatively, the base station may perform aspects of the described functions using special-purpose hardware.

At 1905, the method may include transmitting, to a UE, an indication of a timer during which the UE may refrain from monitoring for downlink control information on a physical downlink channel. The operations of 1905 may be performed in accordance with examples as disclosed herein. In some examples, aspects of the operations of 1905 may be performed by a timer manager 1625 as described with reference to FIG. 16.

At 1910, the method may include receiving, from the UE, a first random access message during a random access procedure. The operations of 1910 may be performed in accordance with examples as disclosed herein. In some examples, aspects of the operations of 1910 may be performed by a random access manager 1630 as described with reference to FIG. 16.

At 1915, the method may include transmitting, based on receiving the first random access message, a control message on the physical downlink channel. The operations of 1915 may be performed in accordance with examples as disclosed herein. In some examples, aspects of the operations of 1915 may be performed by a control message manager 1635 as described with reference to FIG. 16.

The following provides an overview of aspects of the present disclosure:

Aspect 1: A method for wireless communications at a UE, comprising: transmitting, to a base station, a first random access message during a random access procedure; initiating a timer after transmitting the first random access message; monitoring, upon expiration of the timer, a physical downlink channel for a control message as part of the random access procedure; and receiving, during the random access procedure, the control message on the physical downlink channel.

Aspect 2: The method of aspect 1, further comprising: refraining from monitoring for the control message for a duration of the timer.

Aspect 3: The method of any of aspects 1 through 2, further comprising: transmitting the first random access message comprises transmitting a first message of a four-step random access procedure; and monitoring for the control message comprises monitoring for a second random access message of the four-step random access procedure.

Aspect 4: The method of aspect 3, further comprising: initiating, at a first transmission time interval boundary of a next control resource set after expiration of the timer, a random access response monitoring window, wherein the monitoring occurs during the random access response monitoring window.

Aspect 5: The method of any of aspects 1 through 4, wherein transmitting the first random access message comprises transmitting a third message of a four-step random access procedure; and monitoring for the control message comprises monitoring for a scheduling downlink control information message instructing the UE to send a retransmission of the third message of the four-step random access procedure.

Aspect 6: The method of aspect 5, further comprising: initiating, upon expiration of the timer, a contention resolution window, wherein the monitoring occurs during the contention resolution window.

Aspect 7: The method of aspect 6, further comprising: receiving the scheduling downlink control information message instructing the UE to send the retransmission of the third message of the four-step random access procedure; transmitting, during the contention resolution window, the retransmission of the third message of the four-step random access procedure; restarting the timer after transmitting the retransmission of the third message of the four-step random access procedure and upon expiration of the contention resolution window; initiating, upon expiration of the restarted timer, a second contention resolution window; and monitoring, during the second contention resolution window, the physical downlink channel for a second control message as part of the random access procedure.

Aspect 8: The method of any of aspects 1 through 7, wherein transmitting the first random access message comprises transmitting a third message of a four-step random access procedure; and monitoring for the control message comprises monitoring for a retransmission of a fourth message of the four-step random access procedure.

Aspect 9: The method of aspect 8, further comprising: initiating a contention resolution window after transmitting the third message of the four-step random access procedure; monitoring, during the contention resolution window, for the fourth message of the four-step random access procedure; determining, based at least in part on the monitoring, that the UE has failed to receive the fourth message of the four-step random access procedure; identifying an uplink control resource allocated for transmitting feedback information to the base station; and refraining from transmitting a feedback message indicating that the UE has successfully received the third message of the four-step random access procedure on the uplink control resource, wherein monitoring for the retransmission of the fourth message of the four-step random access procedure is based at least in part on refraining from transmitting the feedback message.

Aspect 10: The method of aspect 9, wherein initiating the timer further comprising: initiating the timer during the contention resolution window after a last transmission time interval boundary of the uplink control resource.

Aspect 11: The method of any of aspects 1 through 10, wherein transmitting the first random access message comprises transmitting a first message of a two-step random access procedure; and monitoring for the control message comprises monitoring for a second random access message of the two-step random access procedure.

Aspect 12: The method of aspect 11, further comprising: initiating, at a first transmission time interval boundary of a next control resource set after expiration of the timer, a random access response monitoring window, wherein the monitoring occurs during the random access response monitoring window.

Aspect 13: The method of any of aspects 1 through 12, wherein transmitting the first random access message comprises transmitting a first message of a two-step random access procedure; and monitoring for the control message comprises monitoring for a retransmission of a second message of the two-step random access procedure.

Aspect 14: The method of aspect 13, further comprising: initiating, at a first transmission time interval boundary of a next control resource set after expiration of the timer, a random access response monitoring window; monitoring, during the random access response monitoring window, for the second message of the two-step random access procedure; determining, based at least in part on the monitoring, that the UE has failed to receive the second message of the two-step random access procedure; and transmitting, on an uplink control resource allocated for transmitting feedback information to the base station, a feedback message indicating that the UE has not received the second message of the two-step random access procedure.

Aspect 15: The method of aspect 14, wherein initiating the timer further comprising: initiating the timer during the random access response monitoring window after a last transmission time interval boundary of the uplink control resource.

Aspect 16: The method of any of aspects 14 through 15, wherein initiating the timer further comprises: identifying a fixed offset value; applying the fixed offset value after a last transmission time interval boundary of resources allocated for receiving the second message of the two-step random access procedure; and initiating the timer during the random access response monitoring window after the fixed offset value.

Aspect 17: The method of any of aspects 1 through 16, further comprising: receiving, from the base station, system information comprising an indication of a duration of the timer.

Aspect 18: The method of any of aspects 1 through 17, further comprising: receiving, in a previous random access message, an indication of a duration of the timer.

Aspect 19: The method of any of aspects 1 through 18, further comprising: receiving, from the base station, discontinuous reception configuration information, the discontinuous reception configuration information comprising an indication of a duration of the timer.

Aspect 20: The method of aspect 19, further comprising: receiving, from the base station, an instruction to apply the timer to the random access procedure, wherein initiating the timer is based at least in part on receiving the instruction.

Aspect 21: The method of any of aspects 1 through 20, further comprising: identifying one or more physical random access channel resources for transmitting the first random access message or a second random access message, wherein the identified one or more physical random access channel resources are associated with the timer, wherein initiating the timer is based at least in part on the identified one or more physical random access channel resources.

Aspect 22: The method of any of aspects 1 through 21, further comprising: including, in the first random access message, an indication of a duration of the timer, wherein initiating the timer is based at least in part on including the indication of the duration of the timer in the first random access message.

Aspect 23: The method of any of aspects 1 through 22, further comprising: transmitting, to the base station, an indication that the UE is a reduced capacity UE, wherein initiating the timer is based at least in part on transmitting the indication.

Aspect 24: The method of any of aspects 1 through 23, wherein the UE is a reduced-capability UE.

Aspect 25: A method for wireless communications at a base station, comprising: transmitting, to a UE, an indication of a timer during which the UE may refrain from monitoring for downlink control information on a physical downlink channel; receiving, from the UE, a first random access message during a random access procedure; and transmitting, based at least in part on receiving the first random access message, a control message on the physical downlink channel.

Aspect 26: The method of aspect 25, wherein transmitting the indication of the timer comprises: transmitting system information comprising the indication of the timer.

Aspect 27: The method of any of aspects 25 through 26, wherein transmitting the indication of the timer comprises: transmitting a second random access message prior to the first random access message, the second random access message comprising the indication of the timer.

Aspect 28: The method of any of aspects 25 through 27, wherein transmitting the indication of the timer comprises: transmitting discontinuous reception configuration information, the discontinuous reception configuration information comprising the indication of the timer.

Aspect 29: The method of aspect 28, further comprising: transmitting, to the UE, an instruction to apply the timer to the random access procedure, wherein initiating the timer is based at least in part on receiving the instruction.

Aspect 30: The method of any of aspects 25 through 29, wherein the UE is a reduced-capability UE.

Aspect 31: An apparatus for wireless communications at a UE, comprising a processor; memory coupled with the processor; and instructions stored in the memory and executable by the processor to cause the apparatus to perform a method of any of aspects 1 through 24.

Aspect 32: An apparatus for wireless communications at a UE, comprising at least one means for performing a method of any of aspects 1 through 24.

Aspect 33: A non-transitory computer-readable medium storing code for wireless communications at a UE, the code comprising instructions executable by a processor to perform a method of any of aspects 1 through 24.

Aspect 34: An apparatus for wireless communications at a base station, comprising a processor; memory coupled with the processor; and instructions stored in the memory and executable by the processor to cause the apparatus to perform a method of any of aspects 25 through 30.

Aspect 35: An apparatus for wireless communications at a base station, comprising at least one means for performing a method of any of aspects 25 through 30.

Aspect 36: A non-transitory computer-readable medium storing code for wireless communications at a base station, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting a first random access message during a random access procedure;
   initiating a timer after transmitting the first random access message, wherein the first random access message includes an indication of a duration of the timer, and wherein initiation of the timer is based at least in part on inclusion of the indication of the duration of the timer in the first random access message;
   monitoring, upon expiration of the timer, a physical downlink channel for a control message as part of the random access procedure; and
   receiving, during the random access procedure, the control message on the physical downlink channel.

2. The method of claim 1, further comprising:
   refraining from monitoring for the control message for a duration of the timer.

3. The method of claim 1, further comprising:
   transmitting the first random access message comprises transmitting a first message of a four-step random access procedure; and
   monitoring for the control message comprises monitoring for a second random access message of the four-step random access procedure.

4. The method of claim 3, further comprising:
   initiating, at a first transmission time interval boundary of a next control resource set after expiration of the timer, a random access response monitoring window, wherein the monitoring occurs during the random access response monitoring window.

5. The method of claim 1, wherein:
   transmitting the first random access message comprises transmitting a third message of a four-step random access procedure; and
   monitoring for the control message comprises monitoring for a scheduling downlink control information message instructing the UE to send a retransmission of the third message of the four-step random access procedure,
   wherein the method further comprises initiating, upon expiration of the timer, a contention resolution window, wherein the monitoring occurs during the contention resolution window.

6. The method of claim 1, wherein:
   transmitting the first random access message comprises transmitting a third message of a four-step random access procedure; and
   monitoring for the control message comprises monitoring for a retransmission of a fourth message of the four-step random access procedure.

7. The method of claim 6, further comprising:

initiating a contention resolution window after transmitting the third message of the four-step random access procedure;

monitoring, during the contention resolution window, for the fourth message of the four-step random access procedure;

determining, based at least in part on the monitoring, that the UE has failed to receive the fourth message of the four-step random access procedure;

identifying an uplink control resource allocated for transmitting feedback information; and refraining from transmitting a feedback message indicating that the UE has successfully received the fourth message of the four-step random access procedure on the uplink control resource, wherein monitoring for the retransmission of the fourth message of the four-step random access procedure is based at least in part on refraining from transmitting the feedback message.

8. The method of claim 1, wherein:

transmitting the first random access message comprises transmitting a first message of a two-step random access procedure; and monitoring for the control message comprises monitoring for a second random access message of the two-step random access procedure, wherein the method further comprises: initiating, at a first transmission time interval boundary of a next control resource set after expiration of the timer, a random access response monitoring window, wherein the monitoring occurs during the random access response monitoring window.

9. A method for wireless communications at a user equipment (UE), comprising:

transmitting a first random access message during a random access procedure, wherein transmitting the first random access message comprises transmitting a first message of a two-step random access procedure;

initiating a timer after transmitting the first random access message;

monitoring, upon expiration of the timer, a physical downlink channel for a control message as part of the random access procedure, wherein monitoring for the control message comprises monitoring for a retransmission of a second message of the two-step random access procedure; and receiving, during the random access procedure, the control message on the physical downlink channel, wherein the method further comprises:

initiating, at a first transmission time interval boundary of a next control resource set after expiration of the timer, a random access response monitoring window;

monitoring, during the random access response monitoring window, for the second message of the two-step random access procedure;

determining that the UE has failed to receive the second message of the two-step random access procedure; and transmitting, on an uplink control resource allocated for transmitting feedback information, a feedback message indicating that the UE has not received the second message of the two-step random access procedure, and cedure, and wherein initiating the timer further comprises:

initiating the timer during the random access response monitoring window after a last transmission time interval boundary of the uplink control resource; or identifying a fixed offset value, applying the fixed offset value after a last transmission time interval boundary of resources allocated for receiving the second message of the two-step random access procedure, and initiating the timer during the random access response monitoring window after the fixed offset value.

10. The method of claim 9, wherein initiating the timer comprises:

initiating the timer during the random access response monitoring window after the last transmission time interval boundary of the uplink control resource.

11. The method of claim 9, wherein initiating the timer further comprises:

identifying the fixed offset value;

applying the fixed offset value after the last transmission time interval boundary of resources allocated for receiving the second message of the two-step random access procedure; and initiating the timer during the random access response monitoring window after the fixed offset value.

12. The method of claim 1, further comprising:

receiving system information comprising an indication of the duration of the timer.

13. The method of claim 1, further comprising:

receiving, in a previous random access message, an indication of the duration of the timer.

14. The method of claim 1, further comprising:

identifying one or more physical random access channel resources for transmitting the first random access message or a second random access message, wherein the identified one or more physical random access channel resources are associated with the timer, wherein initiating the timer is based at least in part on the identified one or more physical random access channel resources.

15. The method of claim 1, further comprising:

transmitting an indication that the UE is a reduced capacity UE, wherein initiating the timer is based at least in part on transmitting the indication.

16. An apparatus for wireless communications at a user equipment (UE), comprising one or more memories coupled to one or more processors, wherein the one or more processors are configured to cause the apparatus to:

transmit a first random access message during a random access procedure;

initiate a timer after transmission of the first random access message, wherein the first random access message includes an indication of a duration of the timer, and wherein initiation of the timer is based at least in part on inclusion of the indication of the duration of the timer in the first random access message;

monitor, upon expiration of the timer, a physical downlink channel for a control message as part of the random access procedure; and receive, during the random access procedure, the control message on the physical downlink channel.

17. The apparatus of claim 16, wherein the one or more processors are configured to cause the apparatus to:

refrain from monitoring for the control message for a duration of the timer.

18. The apparatus of claim 16, wherein:

to transmit the first random access message, the one or more processors are configured to cause the apparatus to transmit a first message of a four-step random access procedure; and to monitor for the control message, the one or more processors are configured to cause the apparatus to monitor for a second random access message of the four-step random access procedure.

19. The apparatus of claim 18, wherein the one or more processors are configured to cause the apparatus to:

initiate, at a first transmission time interval boundary of a next control resource set after expiration of the timer, a random access response monitoring window, wherein to monitor, the one or more processors are configured to cause the apparatus to monitor during the random access response monitoring window.

20. The apparatus of claim 16, wherein the one or more processors are configured to cause the apparatus to initiate, upon expiration of the timer, a contention resolution window, and wherein:

to transmit the first random access message, the one or more processors are configured to cause the apparatus to transmit a third message of a four-step random access procedure; and to monitor for the control message, the one or more processors are configured to cause the apparatus to monitor during the contention resolution window and monitor for a scheduling downlink control information message instructing the UE to send a retransmission of the third message of the four-step random access procedure.

21. The apparatus of claim 16, wherein:

to transmit the first random access message, the one or more processors are configured to cause the apparatus to transmit a third message of a four-step random access procedure; and to monitor for the control message, the one or more processors are configured to cause the apparatus to monitor for a retransmission of a fourth message of the four-step random access procedure.

22. The apparatus of claim 21, wherein the one or more processors are configured to cause the apparatus to:

initiate a contention resolution window after transmission of the third message of the four-step random access procedure;

monitor, during the contention resolution window, for the fourth message of the four-step random access procedure;

determine that the UE has failed to receive the fourth message of the four-step random access procedure;

identify an uplink control resource allocated for transmission of feedback information; and refrain from transmitting a feedback message indicating that the UE has successfully received the fourth message of the four-step random access procedure on the uplink control resource.

23. The apparatus of claim 16, wherein:

to transmit the first random access message, the one or more processors are configured to cause the apparatus to transmit a first message of a two-step random access procedure; and to monitor for the control message, the one or more processors are configured to cause the apparatus to monitor for a second random access message of the two-step random access procedure,

wherein the one or more processors are configured to cause the apparatus to:

initiate, at a first transmission time interval boundary of a next control resource set after expiration of the timer, a random access response monitoring window, wherein to monitor, the one or more processors are configured to cause the apparatus to monitor during the random access response monitoring window.

24. The apparatus of claim 16, wherein the one or more processors are configured to cause the apparatus to:

receive system information comprising an indication of the duration of the timer.

25. The apparatus of claim 16, wherein the one or more processors are configured to cause the apparatus to:

receive, in a previous random access message, an indication of the duration of the timer.

26. The apparatus of claim 16, wherein the one or more processors are configured to cause the apparatus to:

identify one or more physical random access channel resources for transmission of the first random access message or a second random access message, wherein the identified one or more physical random access channel resources are associated with the timer, wherein initiation of the timer is based at least in part on the identified one or more physical random access channel resources.

27. The apparatus of claim 16, wherein the one or more processors are configured to cause the apparatus to:

transmit an indication that the UE is a reduced capacity UE, wherein initiation of the timer is based at least in part on transmission the indication.

28. An apparatus for wireless communications at a user equipment (UE), comprising one or more memories coupled to one or more processors, wherein the one or more processors are configured to cause the apparatus to:

transmit a first random access message during a random access procedure, wherein to transmit the first random access message, the one or more processors are configured to cause the apparatus to transmit a first message of a two-step random access procedure;

initiate a timer after transmission of the first random access message;

monitor, upon expiration of the timer, a physical downlink channel for a control message as part of the random access procedure, wherein to monitor for the control message, the one or more processors are configured to cause the apparatus to monitor for a retransmission of a second message of the two-step random access procedure; and receive, during the random access procedure, the control message on the physical downlink channel, wherein the one or more processors are configured to cause the apparatus to:

initiate, at a first transmission time interval boundary of a next control resource set after expiration of the timer, a random access response monitoring window;

monitor, during the random access response monitoring window, for the second message of the two-step random access procedure;

determine that the UE has failed to receive the second message of the two-step random access procedure; and transmit, on an uplink control resource allocated for transmission of feedback information, a feedback message indicating that the UE has not received the second message of the two-step random access procedure, and wherein to initiate the timer, the one or more processors are configured to cause the apparatus to:

initiate the timer during the random access response monitoring window after a last transmission time interval boundary of the uplink control resource; or identify a fixed offset value, apply the fixed offset value after a last transmission time interval boundary of resources allocated for reception of the second message of the two-step random access procedure, and initiate the timer during the random access response monitoring window after the fixed offset value.

29. The apparatus of claim 28, wherein to initiate the timer, the one or more processors are configured to cause the apparatus to:

initiate the timer during the random access response monitoring window after the last transmission time interval boundary of the uplink control resource.

30. The apparatus of claim 28, wherein to initiate the timer, the one or more processors are configured to cause the apparatus to:

identify the fixed offset value;

apply the fixed offset value after the last transmission time interval boundary of resources allocated for reception of the second message of the two-step random access procedure; and initiate the timer during the random access response monitoring window after the fixed offset value.

\* \* \* \* \*